United States Patent [19]

Drees

[11] Patent Number: 5,279,342
[45] Date of Patent: Jan. 18, 1994

[54] WOODWORKING MACHINE

[76] Inventor: Edward Drees, 11011 Ayres Ave., Los Angeles, Calif. 90064

[21] Appl. No.: 942,645

[22] Filed: Sep. 9, 1992

Related U.S. Application Data

[63] Continuation-in-part of Ser. No. 750,829, Aug. 27, 1991, Pat. No. 5,146,962.

[51] Int. Cl.$^5$ .............................................. B27C 5/06
[52] U.S. Cl. ..................... 144/144 R; 144/134 A; 144/137; 144/145 A; 144/245 R; 144/245 C; 144/372; 269/25; 269/34
[58] Field of Search .................................. 269/25, 32, 34, 84; 409/125, 130; 144/134 A; 137; 144 R; 144.5; 242 R; 245 R; 245 C; 372

[56] References Cited

U.S. PATENT DOCUMENTS

| | | | |
|---|---|---|---|
| 3,442,309 | 5/1969 | Jentsch | 144/144 R |
| 3,541,922 | 11/1970 | Dunlap | 144/144 R |
| 3,814,153 | 6/1974 | Schmidt | 144/134 R |
| 3,942,566 | 3/1976 | Schmidt | 144/134 R |
| 4,840,015 | 6/1989 | Schultz | 144/245 R |
| 4,944,339 | 7/1990 | Luyten | 144/144 R |
| 4,949,892 | 8/1990 | Neely et al. | 144/245 C |

*Primary Examiner*—W. Donald Bray
*Attorney, Agent, or Firm*—J. E. Brunton

[57] ABSTRACT

An apparatus for precisely forming curved surfaces on a wooden workpiece in which the workpiece is automatically centered on a work table which is controllably movable inwardly and outwardly relative to a rotating cutter. The rotating cutter is slidably mounted within a supporting frame so that the cutter can be controllably moved past the workpiece as the workpiece is moved inwardly and outwardly relative to the cutter. A template and a template follower precisely controls the movement of the table and the workpiece relative to the cutter to produce precisely formed curved surfaces on the workpiece.

7 Claims, 28 Drawing Sheets

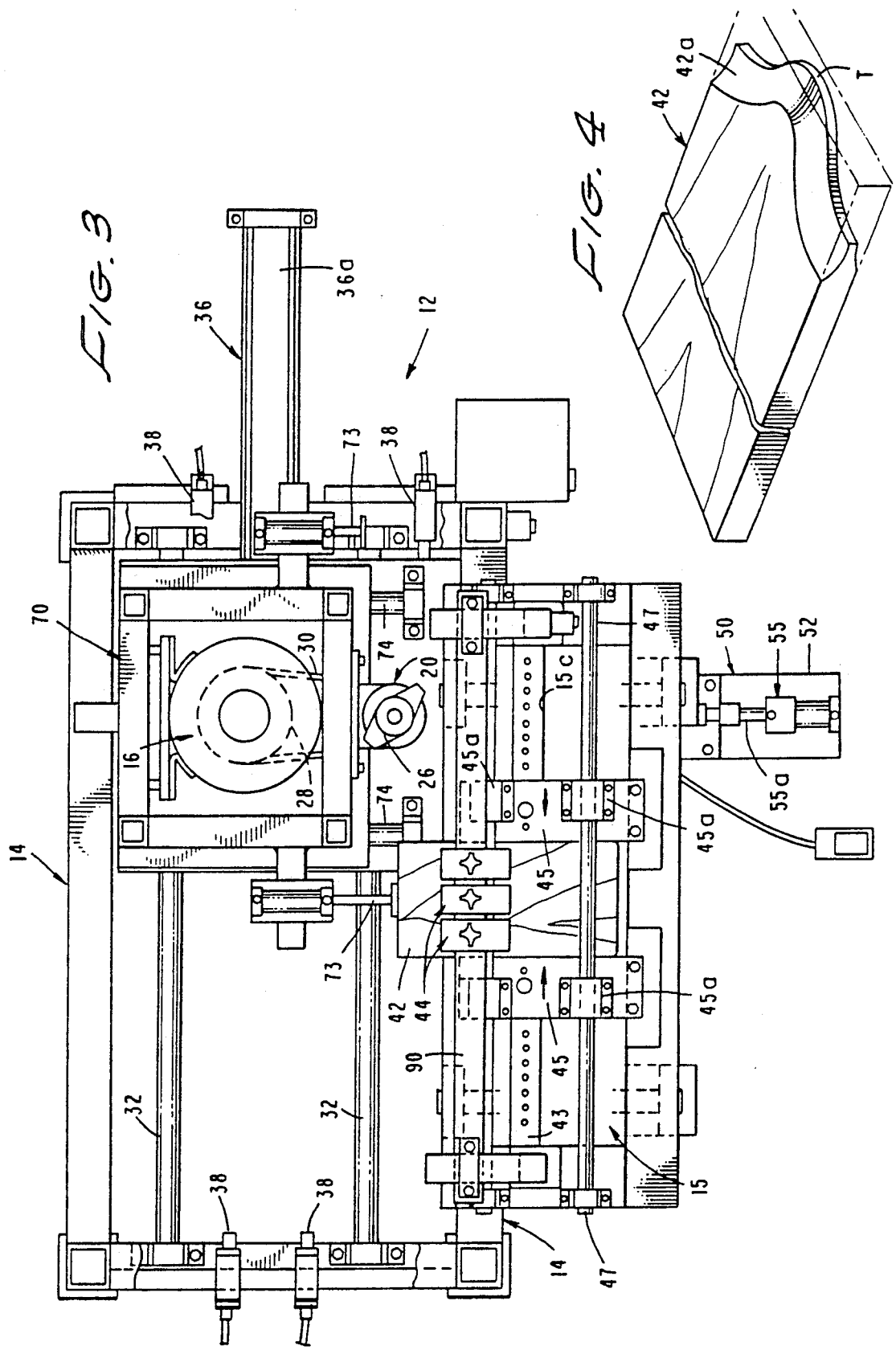

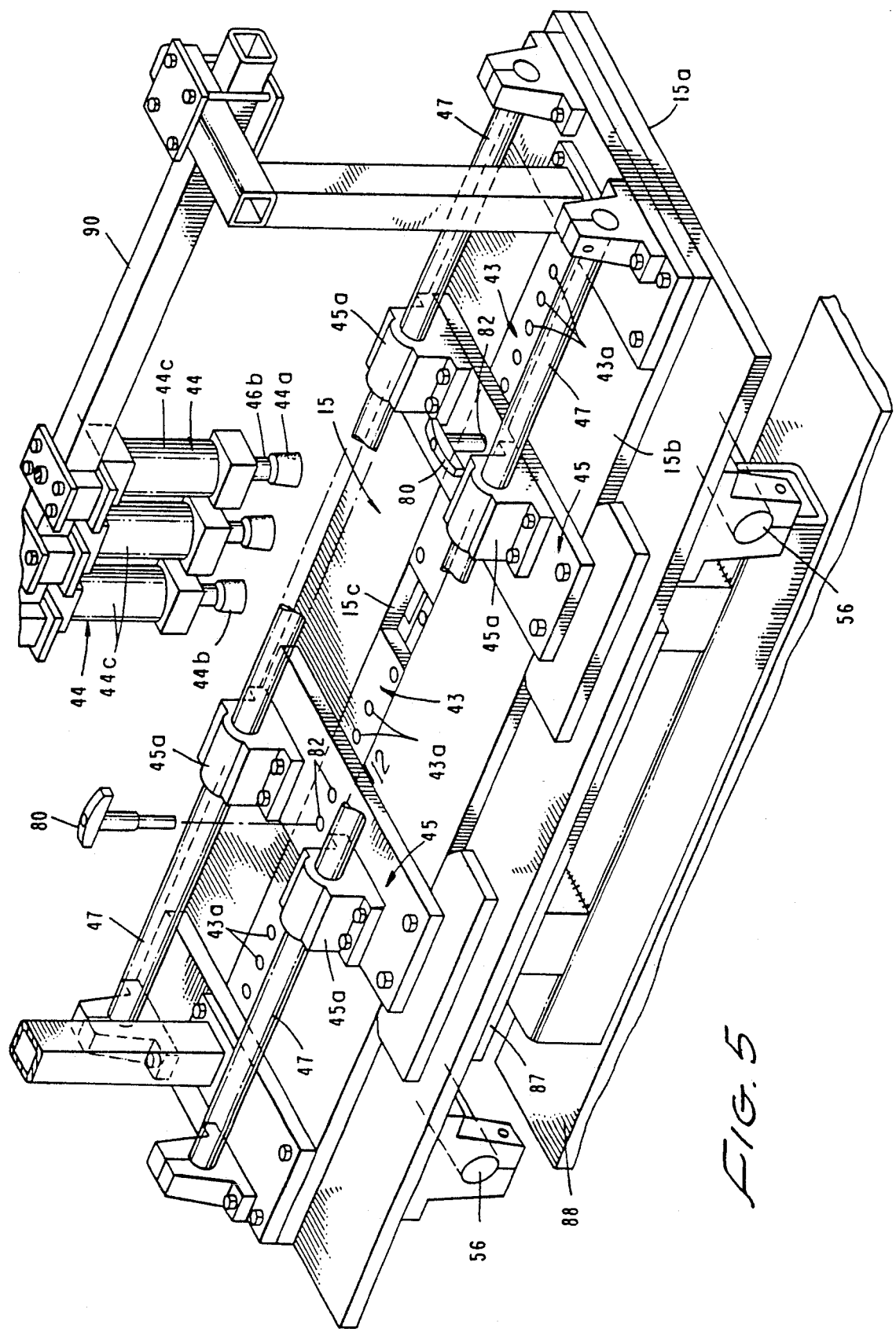

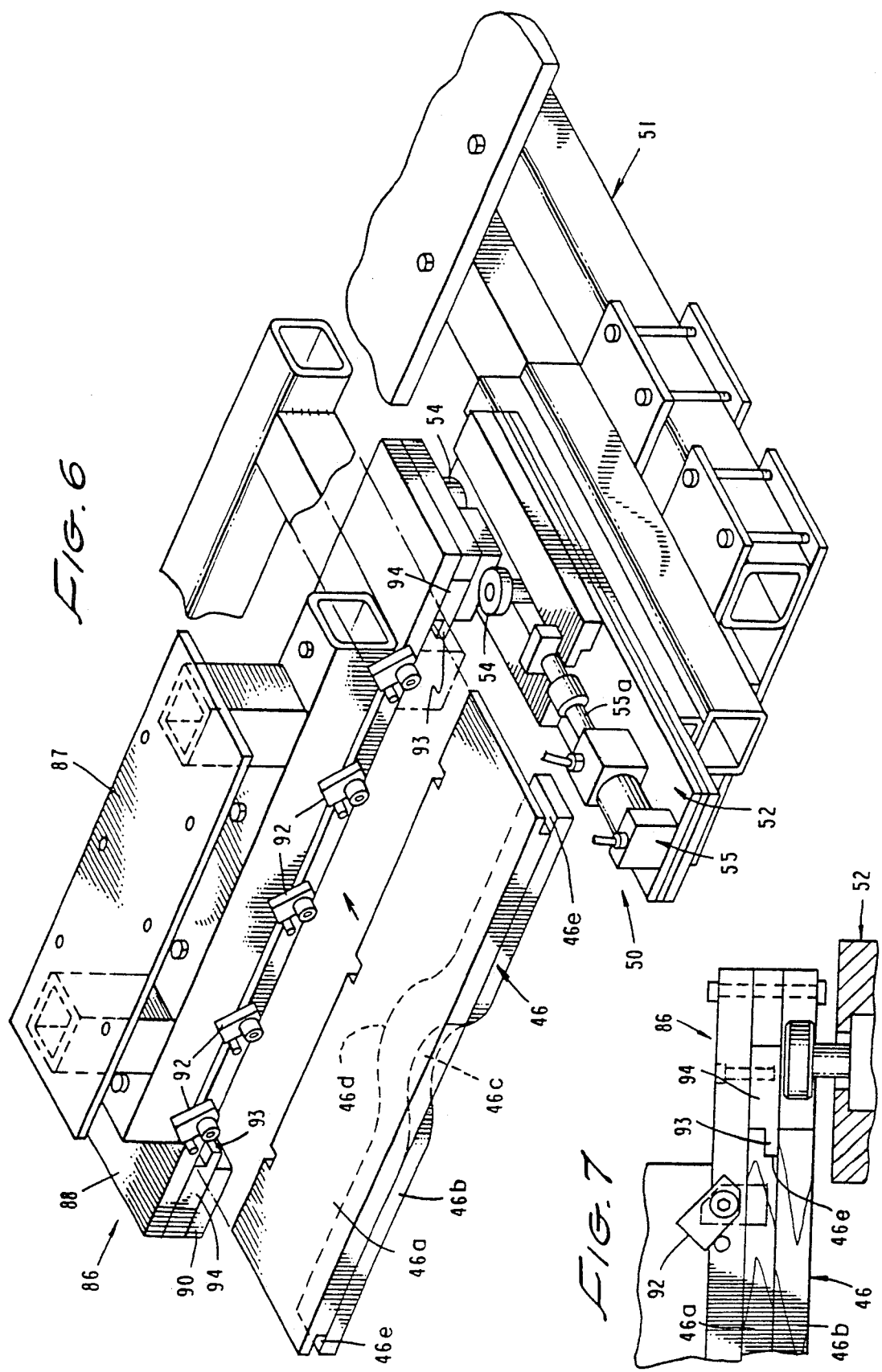

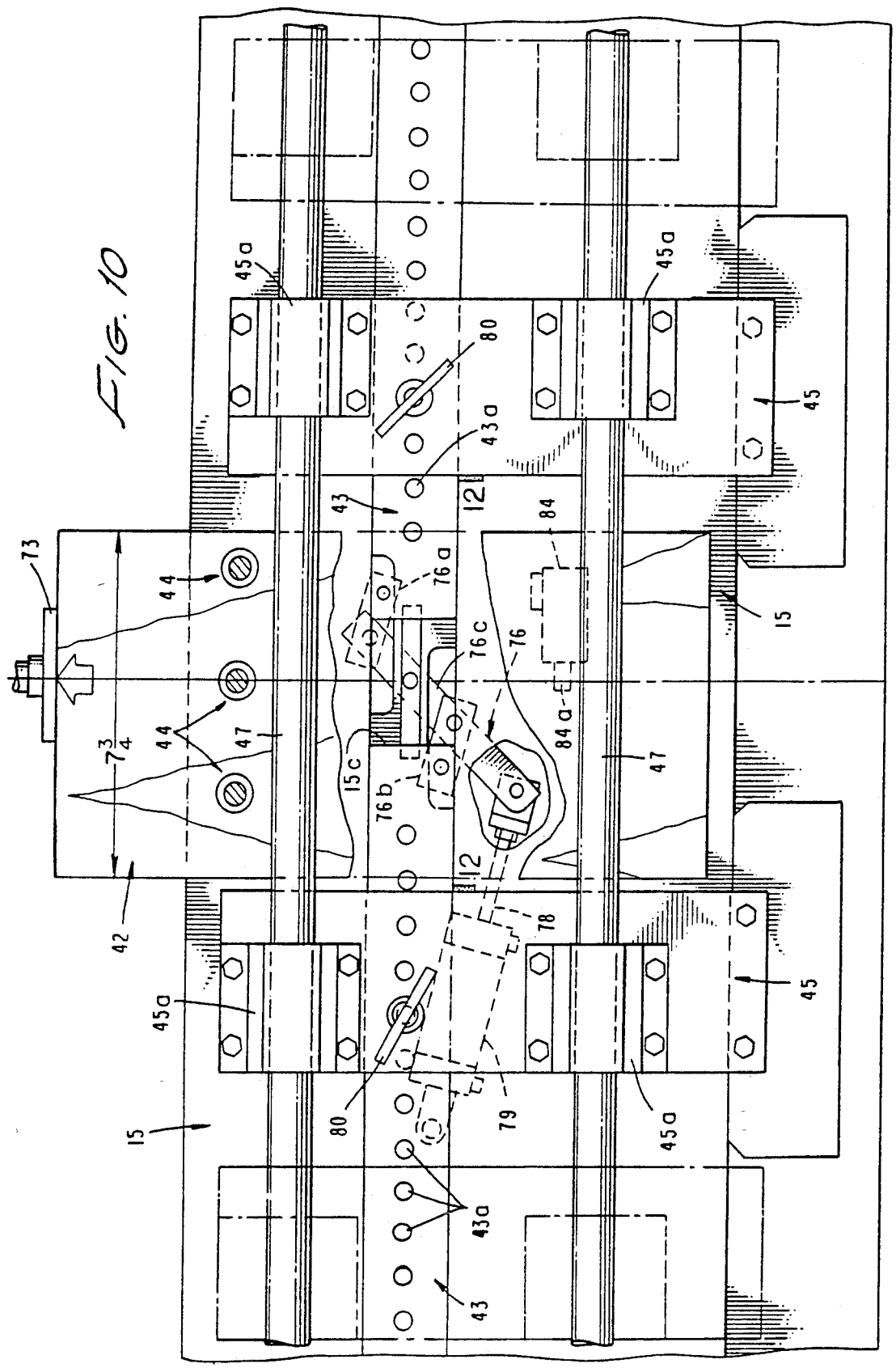

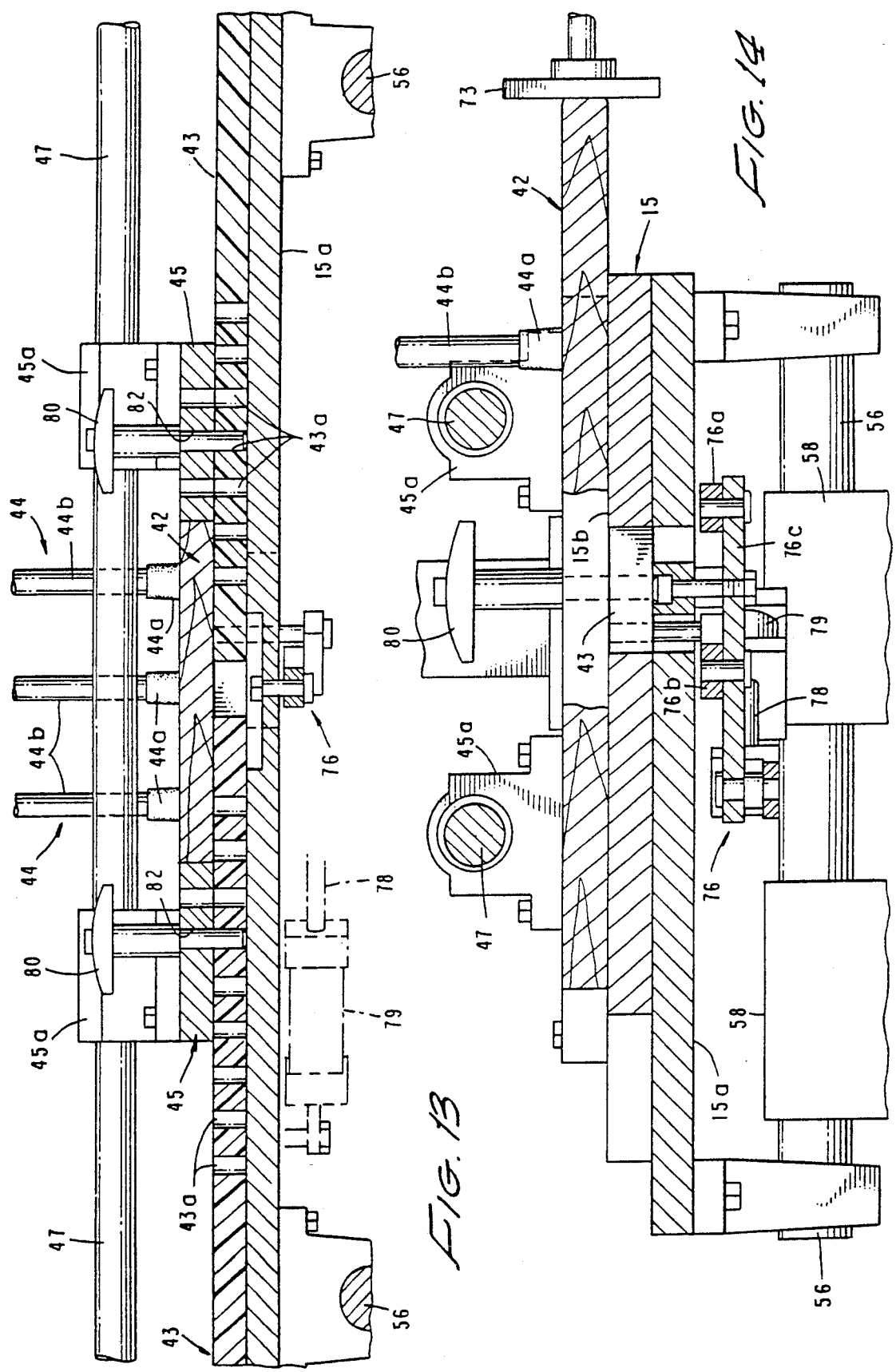

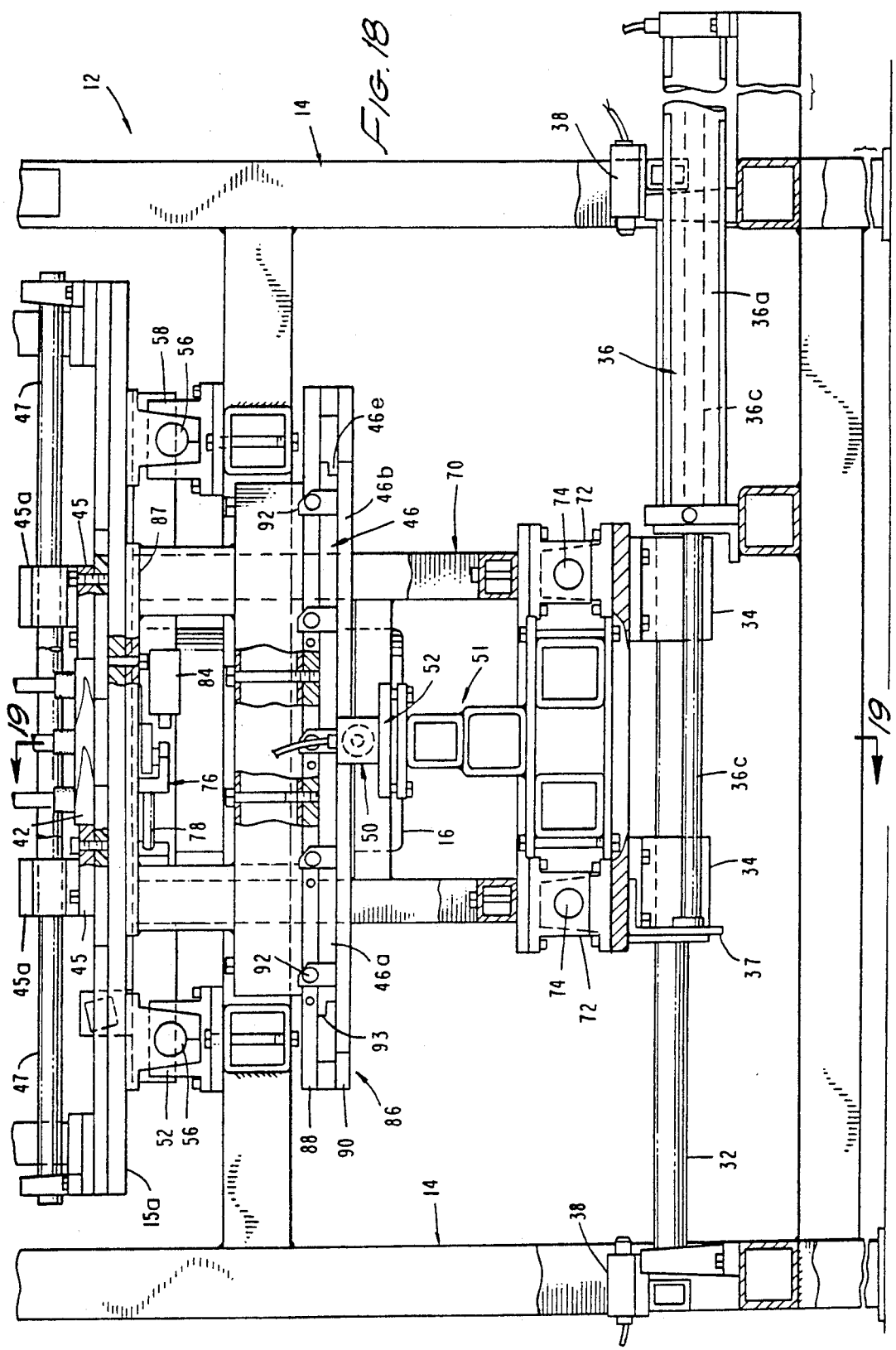

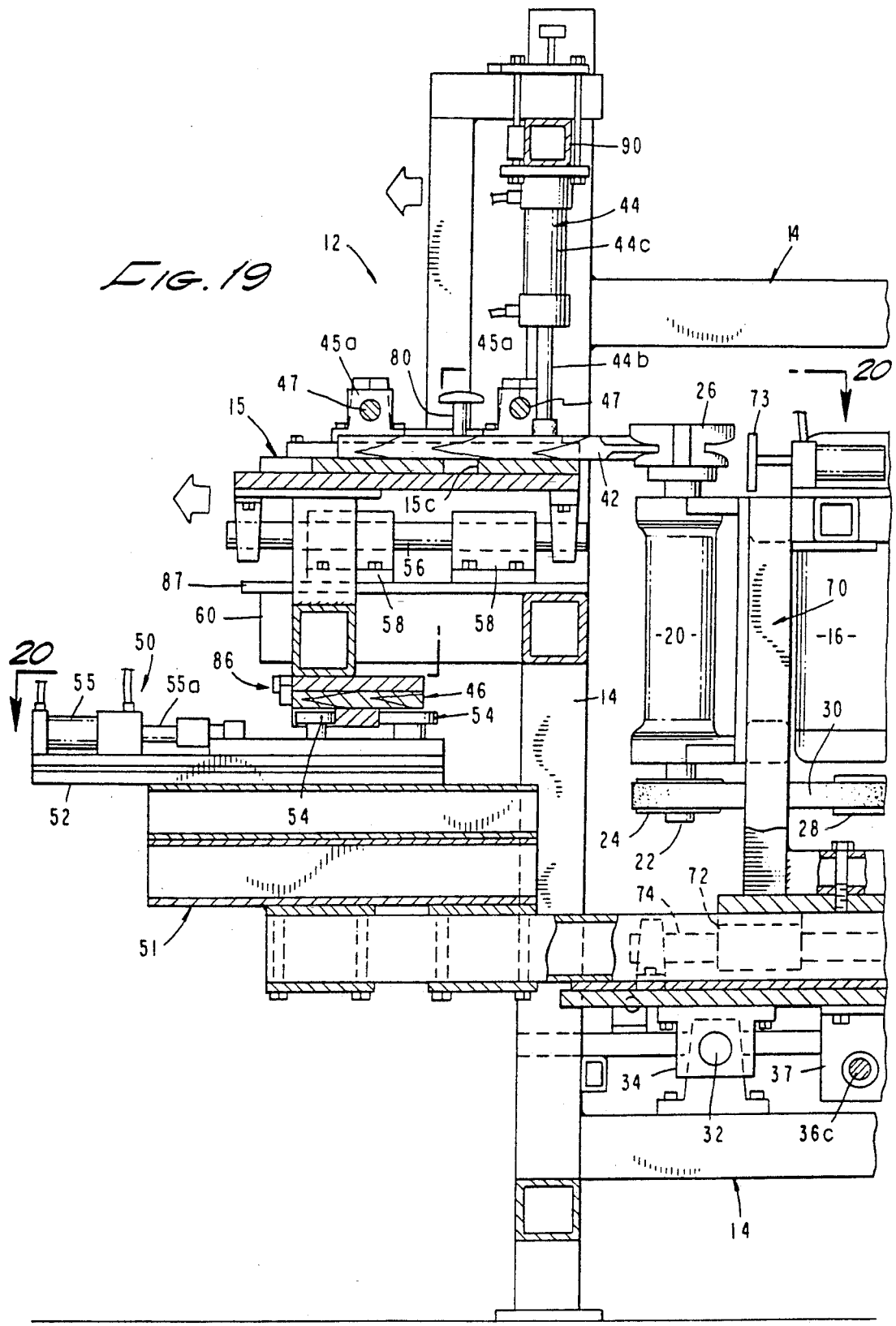

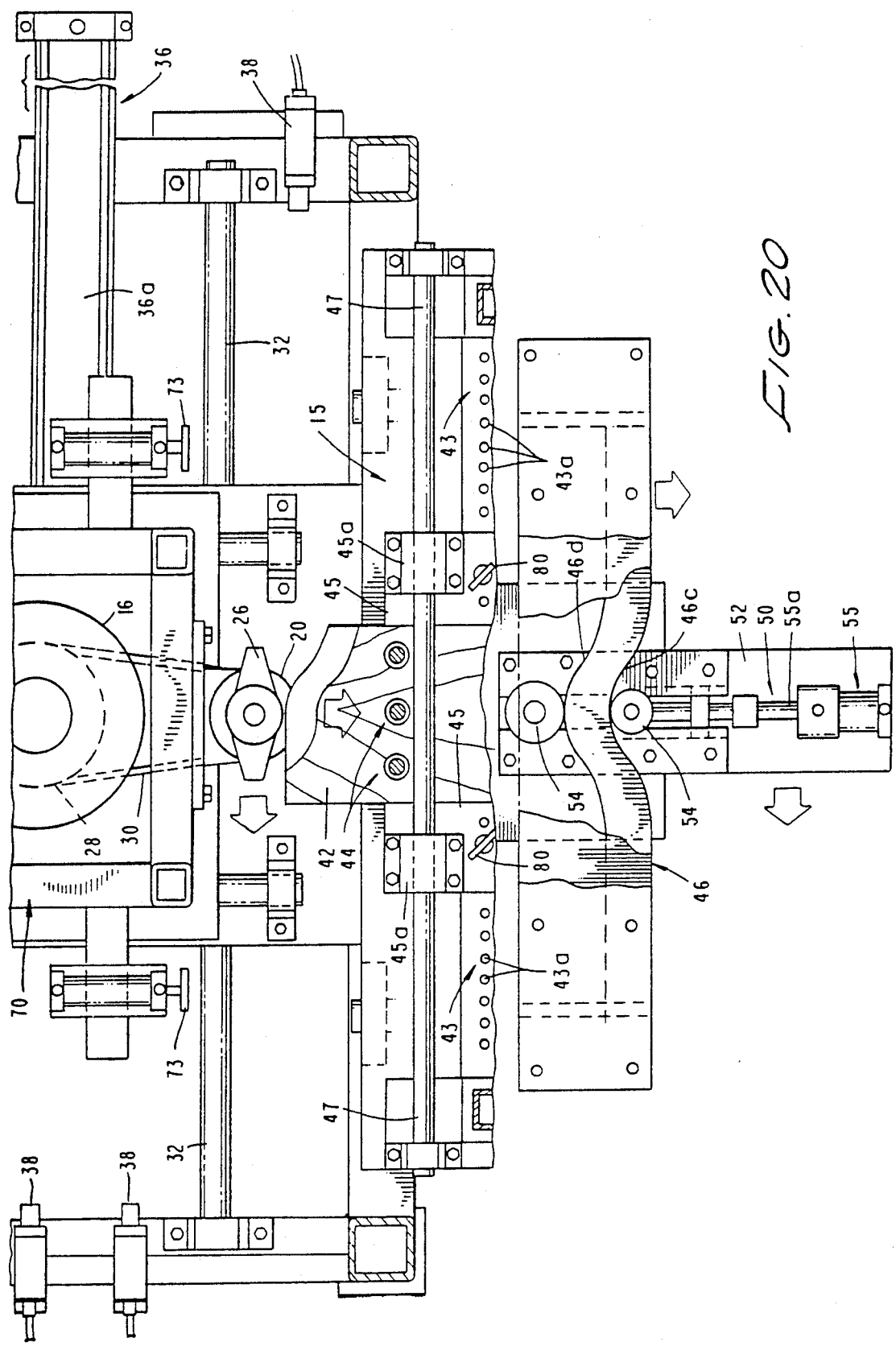

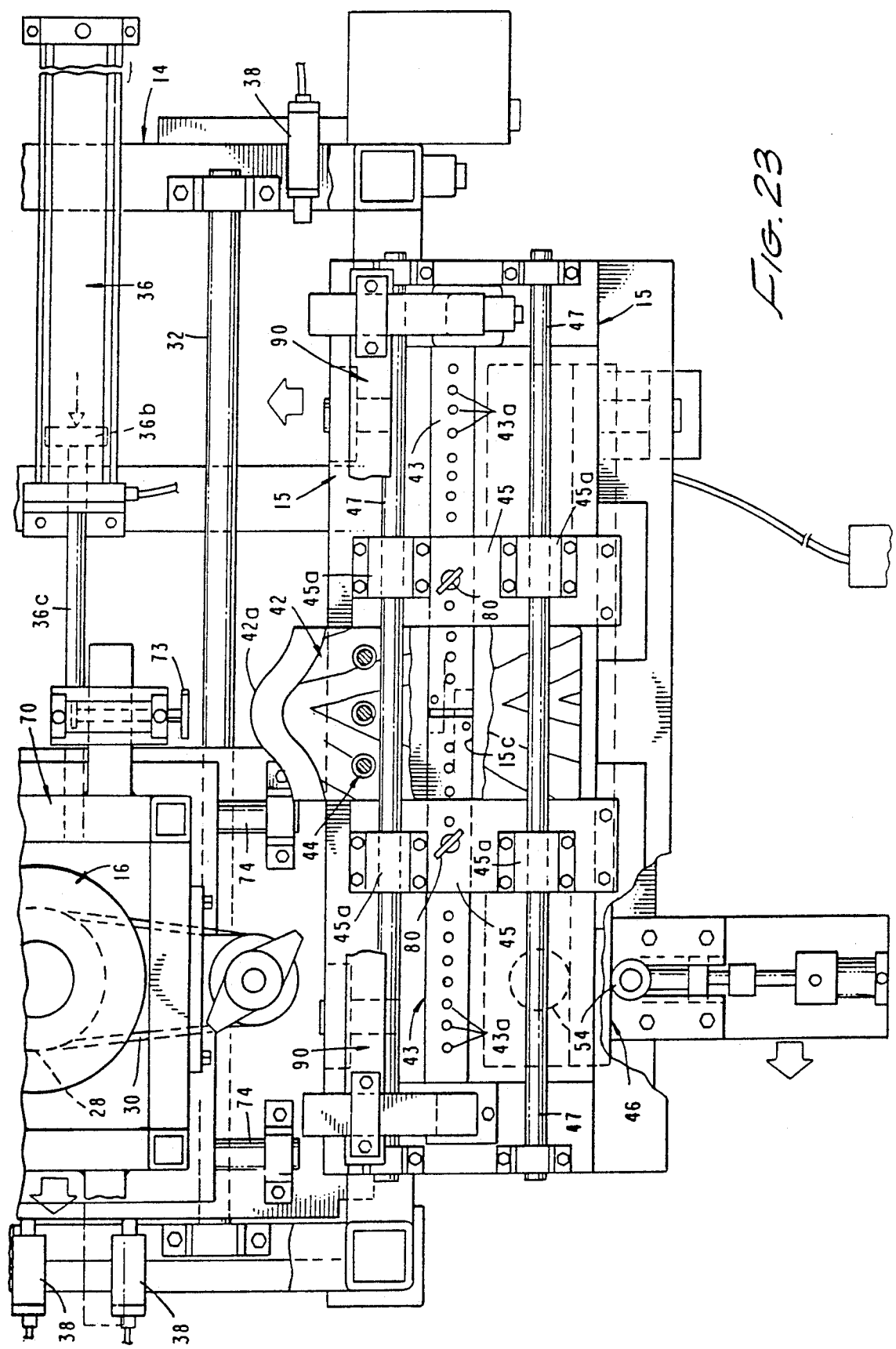

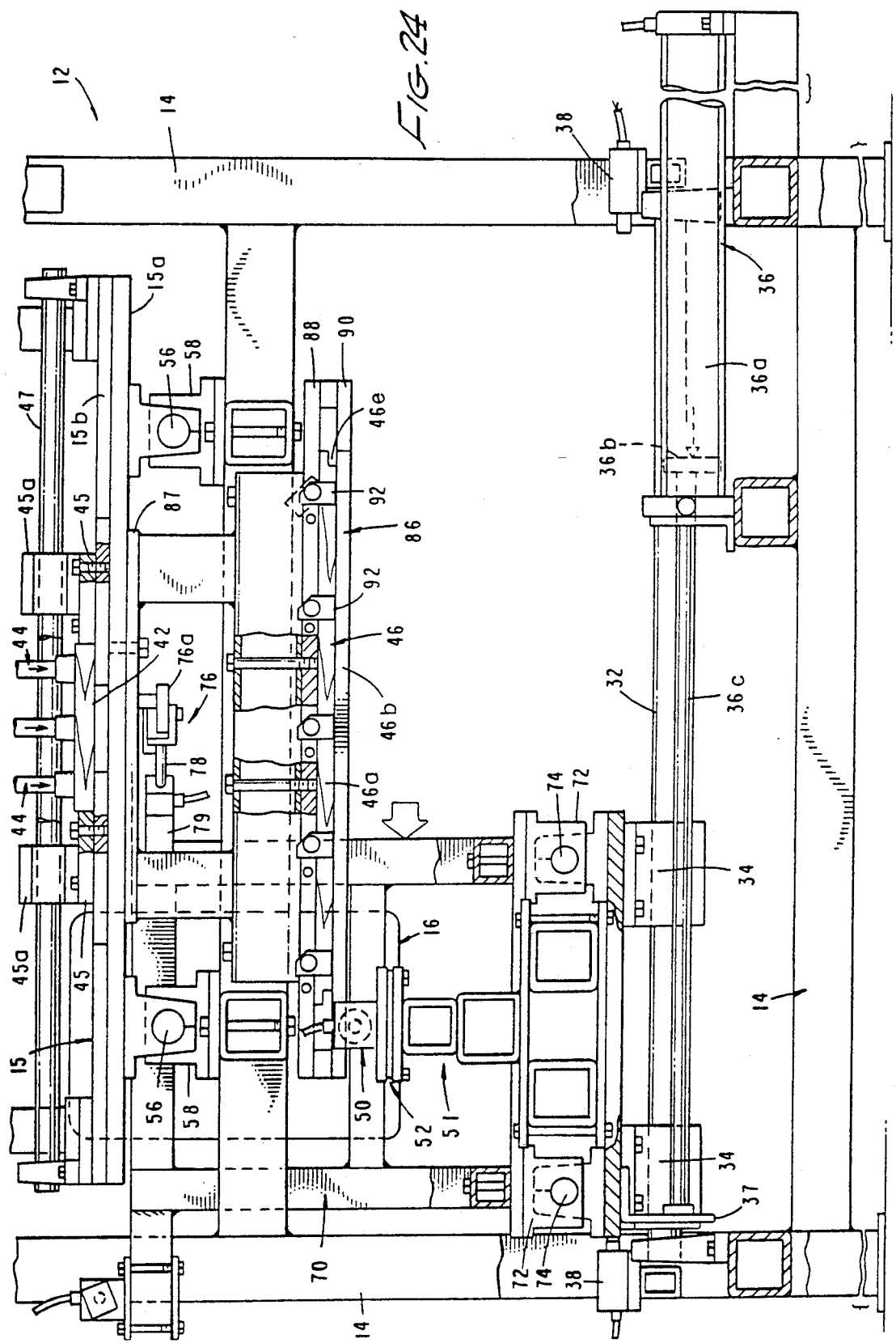

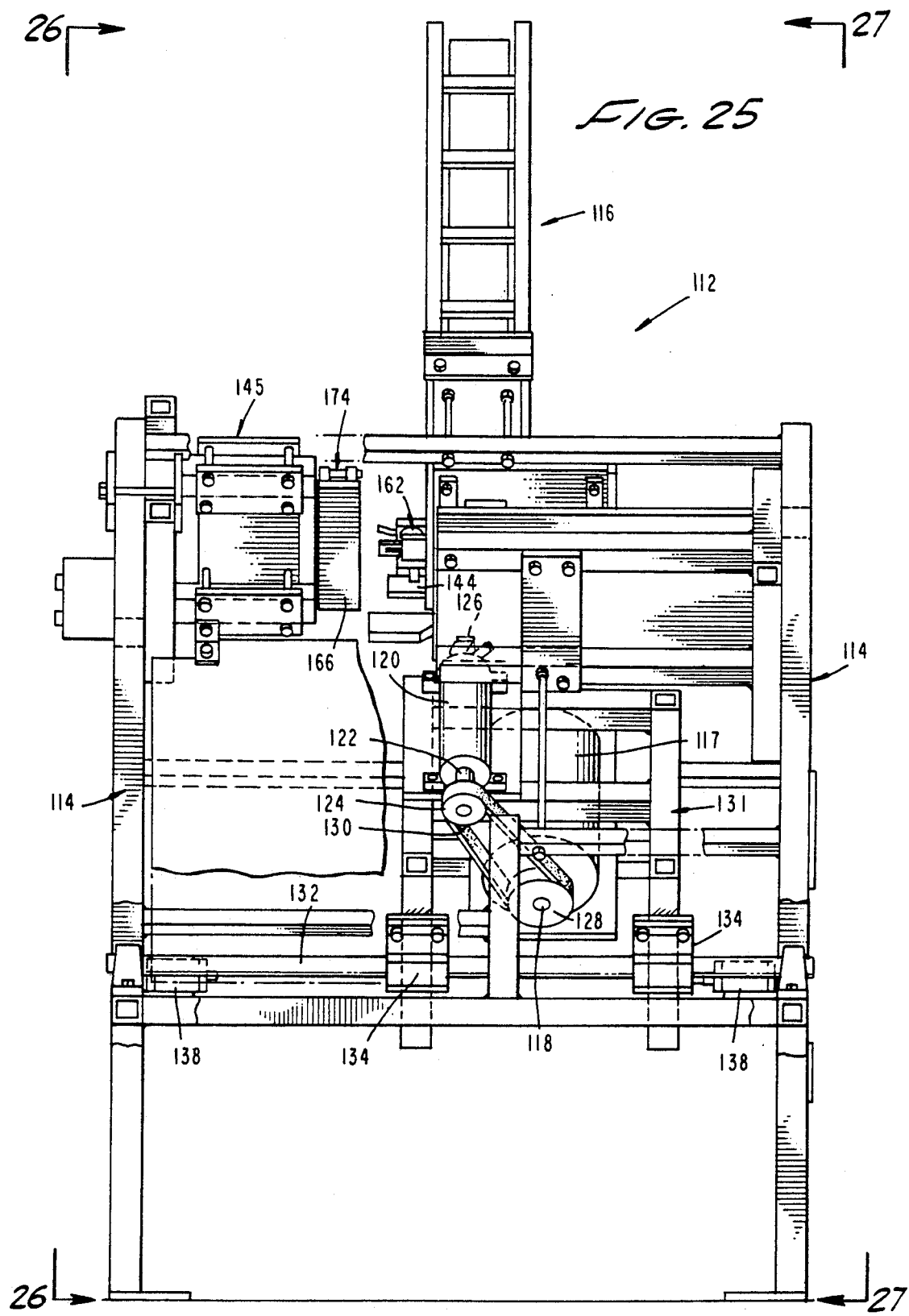

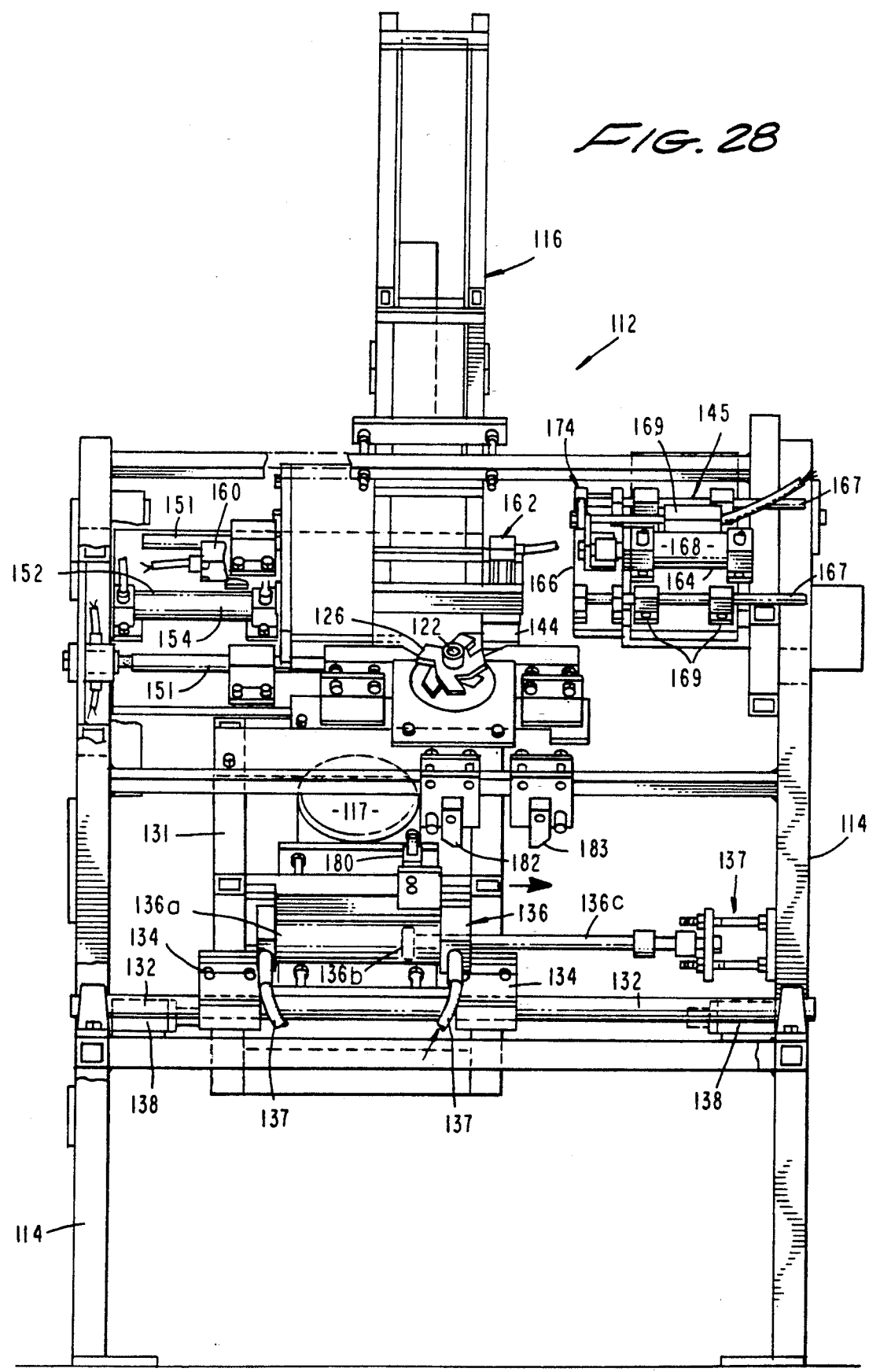

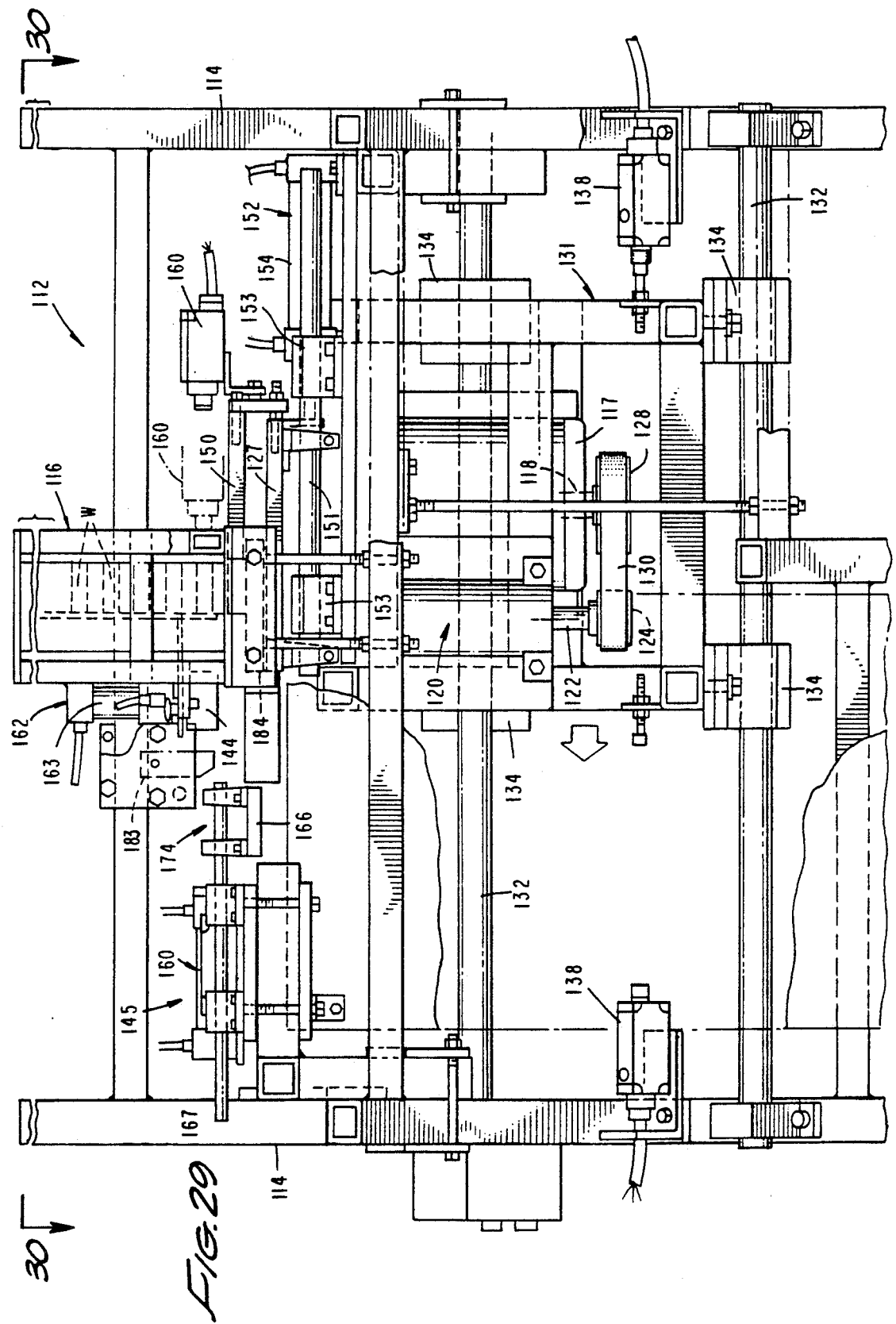

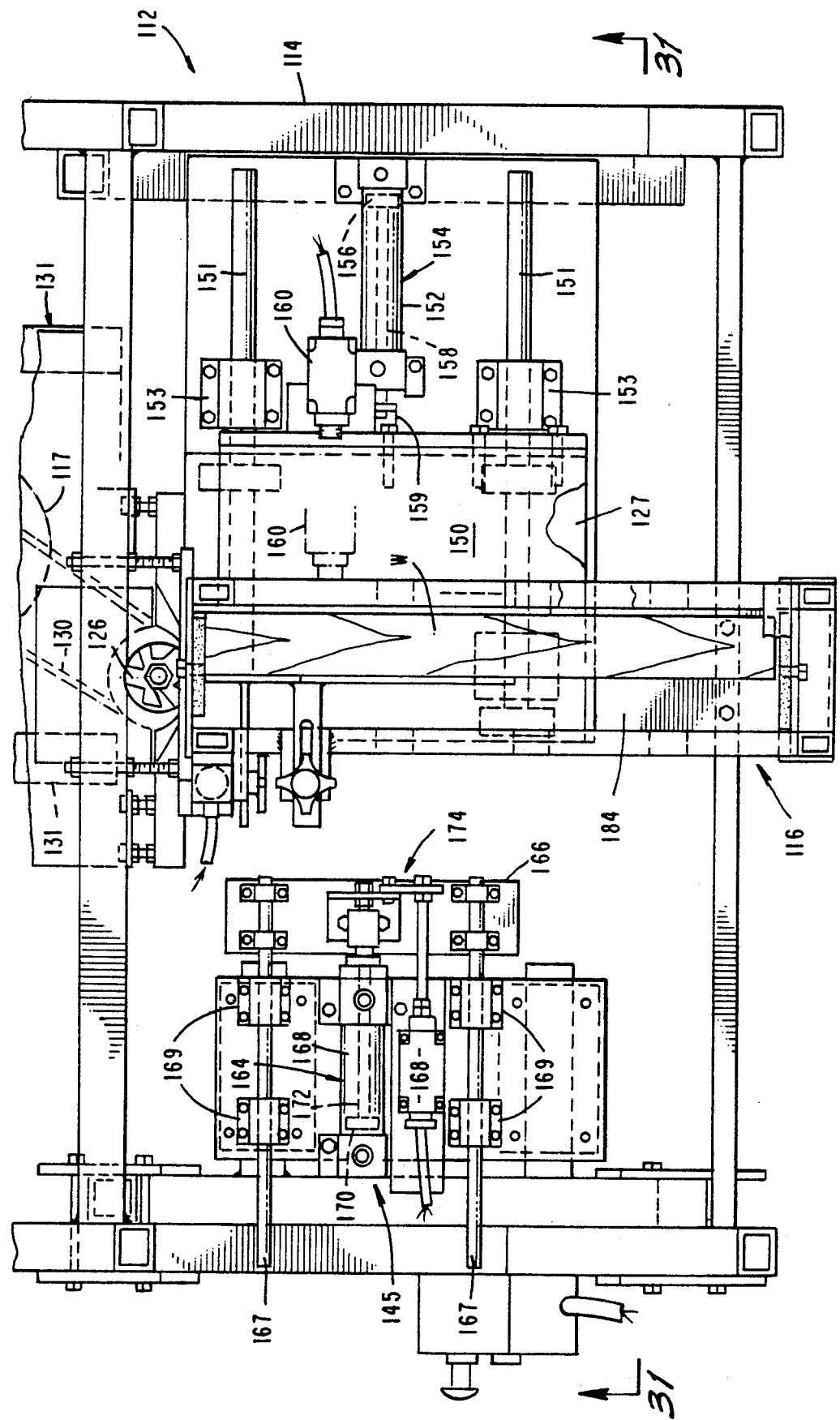

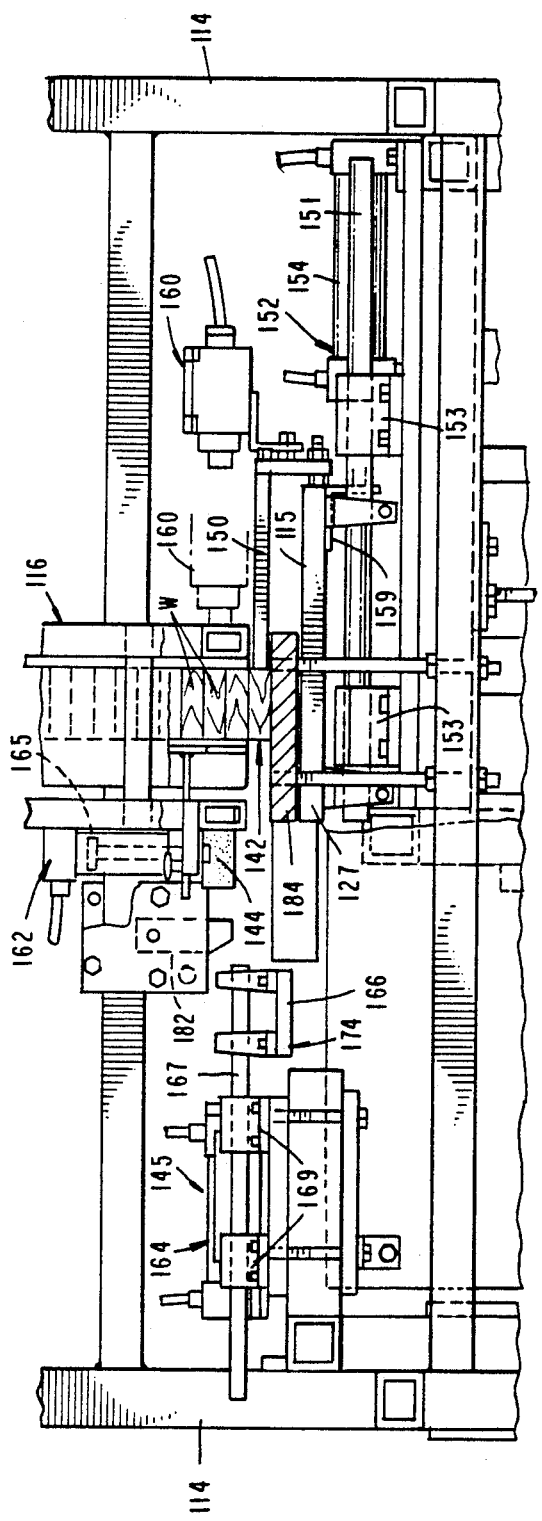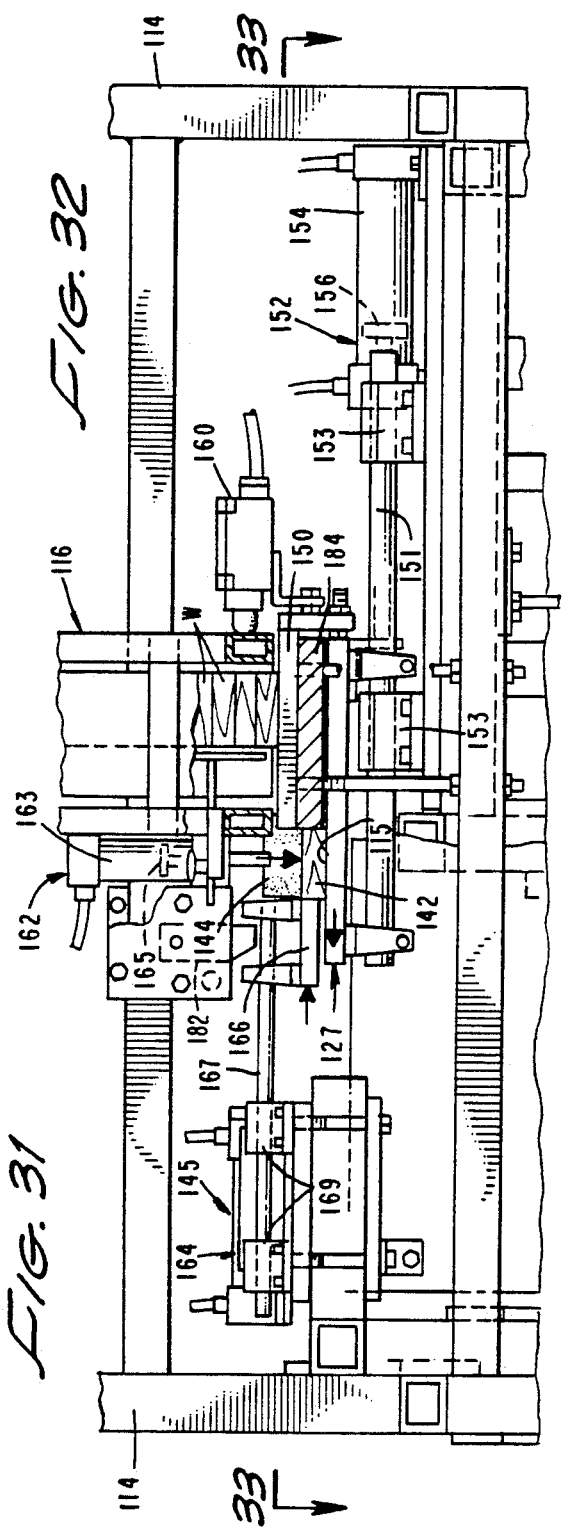

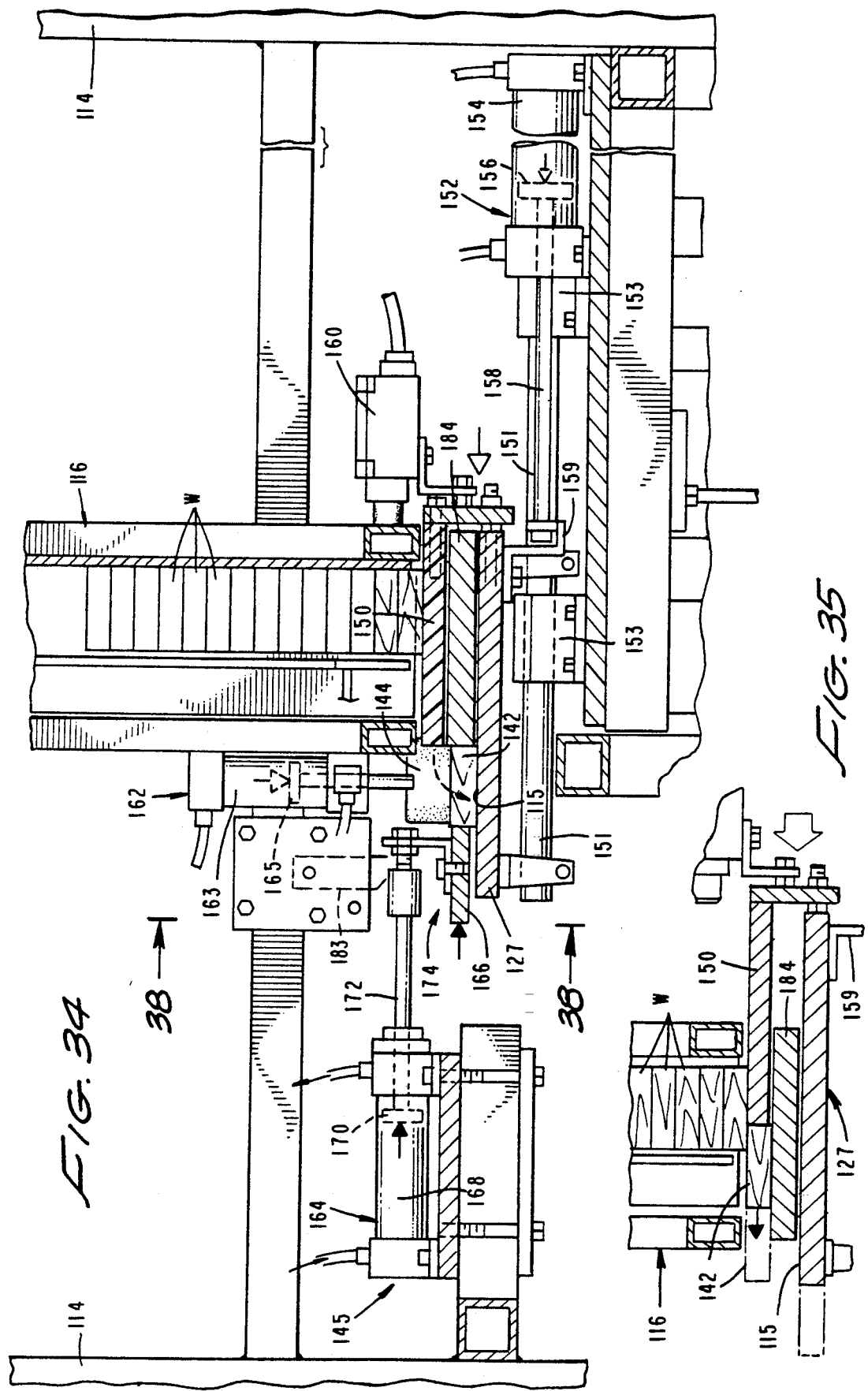

WOODWORKING MACHINE

BACKGROUND OF THE INVENTION

This is a Continuation In Part Application of Co-pending application, Ser. No. 07/750,829 filed Aug. 27, 1991 now U.S. Pat. No. 5,146,962.

FIELD OF THE INVENTION

The present invention relates generally to woodworking apparatus. More particularly, the invention concerns a woodworking machine for precisely and reproduceably forming curved surfaces on a workpiece.

Discussion of the Invention

Introduction

In fine furniture and cabinet making, it is frequently necessary to precisely form compound curved surfaces on the workpiece. For example, in professional, large volume cabinet making operations it is necessary to produce cabinet doors that have a variety of differently styled, generally arch-shaped center panels. The center panels are supported between the stiles and rails of the door and are often of complex shape. In large volume operations the panels must conform to close tolerances so that they can be interchangeably fitted to their mating separately fabricated stiles and rails.

In the past, particularly in cabinet making, the curved surfaces on door panels and the like were formed using spindle shapers or routers. When routers were used, the router was moved relative to the fixed workpiece with templates being used to guide the path of travel of the router cutter. This approach was less than satisfactory, particularly in large volume operations, One drawback of this approach was that the cutting operation was somewhat cumbersome and at least semi-skilled workers were required to properly set up and manipulate the router. Another drawback was that both the set-up and cutting operation was time consuming and great care had to be exercised to make certain that neither the workpiece nor the template shifted during the cutting step. Desired precision was typically difficult to achieve and therefore, rejection rates were high. Another drawback resided in the fact that, because the cutter was required to move relative to the workpiece, the provision of adequate safety guards for the cutter was difficult or impossible.

When spindle shapers were used to form the door panels, the workpiece was moved relative to a fixedly positioned rotating cutter head, once again using templates or patterns typically affixed to the workpiece. These operations were also cumbersome, time consuming and difficult.

The aforementioned drawbacks of the prior art are uniquely overcome by the apparatus of the present invention wherein the workpiece is securely mounted on a work table which is controllably moved inwardly and outwardly relative to a rotating cutter. The rotating cutter is driven by a high-speed motor and is controllably moved transversely past the workpiece as the workpiece is moved inwardly and outwardly. The path of travel of the work table is precisely controlled by a template so that extreme accuracy and precise reproduction can be achieved in forming the curved surfaces on the workpiece. The motor which drives the cutter is reciprocally movable along rigid guide rails mounted internally of a cage-like supporting frame to which the work table is moveably connected. Once the apparatus is set up it can be operated with utmost safety by relatively unskilled workmen to produce precisely configured parts at a very high rate of speed. Additional, novel and unique features of the apparatus will become apparent from the description which follows.

SUMMARY OF THE INVENTION

It is an object of the present invention to provide an apparatus for precisely forming curved surfaces on a wooden workpiece in which the workpiece is removably secured to a work table which is controllably movable inwardly and outwardly relative to a rotating cutter.

It is another object of the invention to provide an apparatus of the aforementioned character in which the rotating cutter is slidably mounted within a supporting frame so that the cutter can be controllably moved past the workpiece as the workpiece is moved inwardly and outwardly relative to the cutter.

Another object of the present invention is to provide an apparatus as described in the preceding paragraphs in which a template and template follower is provided to precisely control the movement of the work table relative to the cutter.

Another object of the invention is provide an apparatus of the class described in which the workpiece is automatically centered on the work table and is securely held in position by operator-actuated clamps.

Another object is to provide an apparatus of the character described in the preceding paragraph which includes a safety device for disabling the centering mechanism if a workpiece of an incorrect size is inadvertently placed on the work table.

Still another object of the invention is to provide an apparatus for precisely making a variety of differently configured arch-shaped panels for cabinet doors which is safe and easy to operate by unskilled workmen to produce high-quality, precision panels.

Yet another object of the invention is to provide an apparatus as described in the preceding paragraph which is of simple design, is highly reliable in use and can be inexpensively manufactured and maintained.

BRIEF DESCRIPTION OF THE DRAWINGS

FIG. 3 is a top plan view of the machine showing the workpiece clamped in position on the supporting table.

FIG. 4 is a generally perspective view of the finished workpiece after the curved surfaces have been cut.

FIG. 5 is an enlarged fragmentary perspective view of the upper forward portion of the apparatus of the invention.

FIG. 6 is an enlarged perspective view of the lower, forward portion of the apparatus of the invention.

FIG. 7 is an enlarged, fragmentary cross-sectional view of the template and template follower portions of the apparatus.

FIG. 10 is a fragmentary top plan view of the supporting table of the apparatus partly broken away to show the construction of the mechanism for operating the centering slides of the machine which function to precisely center the workpiece relative to the cutter head.

FIG. 13 is a cross-sectional view taken along lines 13—13 of FIG. 11.

FIG. 14 is a cross-sectional view taken along lines 14—14 of FIG. 11.

FIG. 15 is a cross-sectional view taken along lines 15—15 of FIG. 11.

FIG. 16 is a cross-sectional view taken along lines 16—16 of FIG. 11

FIG. 17 is a fragmentary top plan view similar to FIG. 11 but showing the activation of a safety switch which functions to deactivate the centering slide operating mechanism.

FIG. 18 is a front positional view showing the motor and cutter head assembly of the apparatus in position at the approximate mid-point of the cutting cycle.

FIG. 19 is a cross-sectional view taken along lines 19—19 of FIG. 18.

FIG. 20 is a view taken along lines 20—20 of FIG. 19.

FIG. 23 is a top plan positional view illustrating the position of the cutter head after completion of a full forward cycle.

FIG. 24 is a front view showing the position of the cutter head after completion of a full forward cycle.

FIG. 25 is a front elevational view of another form of woodworking apparatus of the present invention.

FIG. 28 is a rear view of the form of the apparatus shown in FIG. 25.

FIG. 29 is a view taken along lines 27—27 of FIG. 27.

FIG. 31 is a view taken along lines 31—31 of FIG. 30B.

FIG. 32 is a view similar to FIG. 31 but showing the workpiece being clamped in position relative to the cutter.

FIG. 34 is a cross-sectional view taken along lines 34—34 of FIG. 33B.

FIG. 35 is a fragmentary view showing the displacement of the workpiece from the hopper to the cutting position.

DESCRIPTION OF ONE EMBODIMENT OF THE INVENTION

Figure 1:
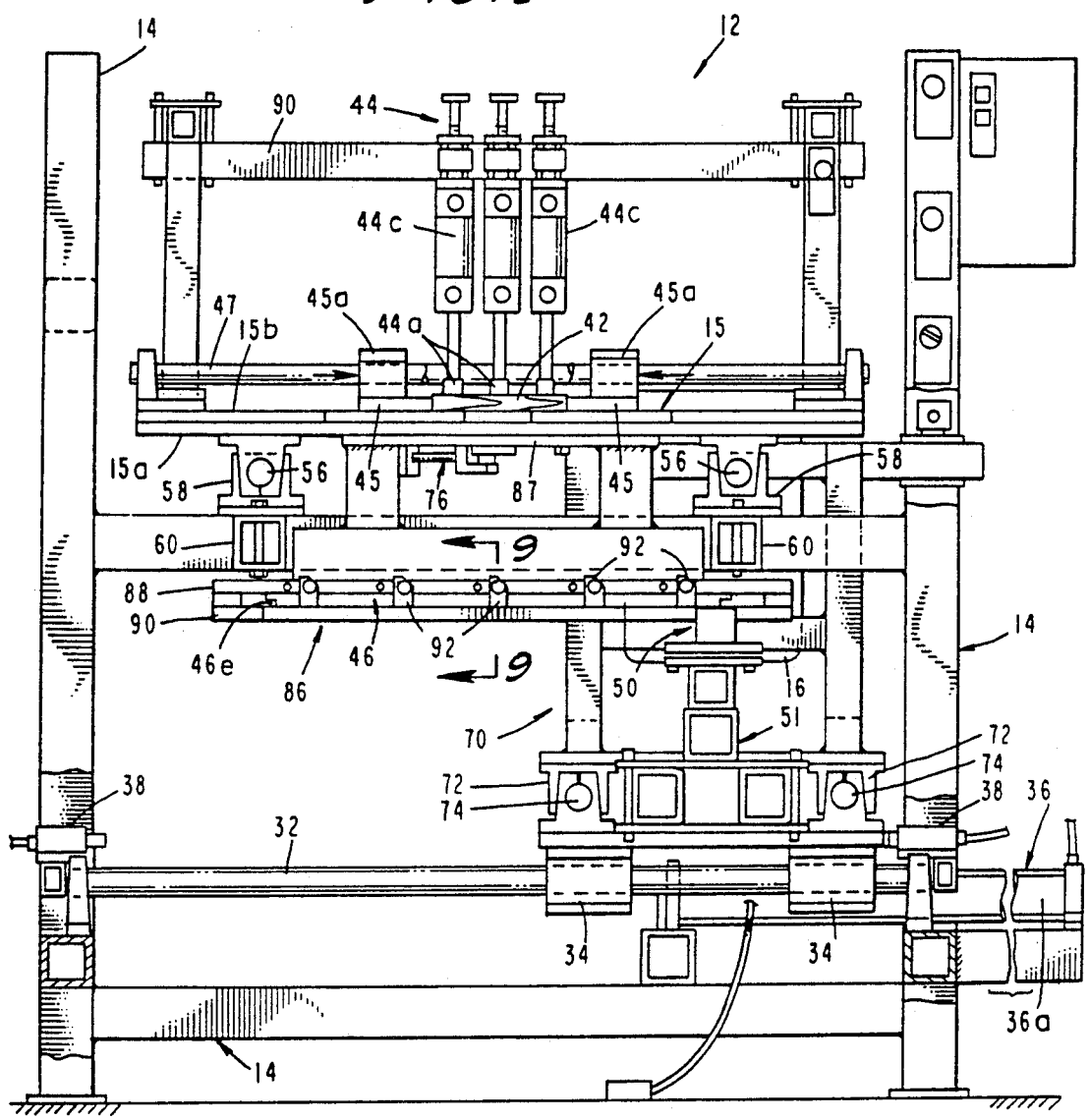
FIG. 1 is a front view of the woodworking machine of the present invention.
Figure 2:
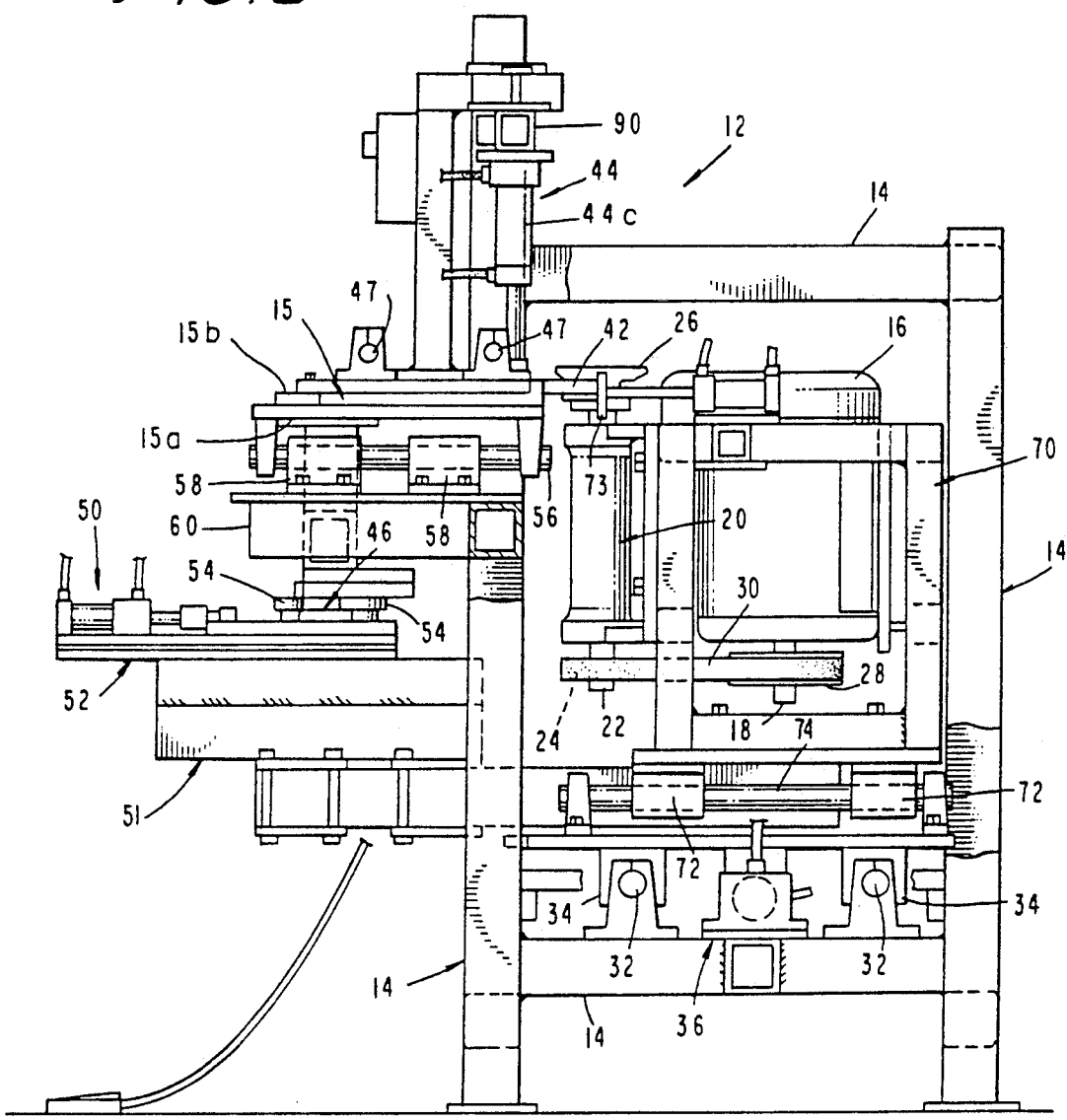
FIG. 2 is a side view of the machine.

Referring to the drawings and particularly to FIGS. 1, 2 and 3, the apparatus for cutting a curved surface on a workpiece of wood, plastic or the like is generally designated by the numeral 12. The major operating subassemblies of the apparatus of the invention comprise a rigid, cage-like supporting frame 14, cutter means mounted within the frame for cutting the workpiece, support means, including a table 15, for supporting the work-piece, and follower means operably associated with the cutting means for following a preselected template. As will be described more fully hereinafter, the template or pattern is removably mounted beneath the table and is provided with a downwardly protruding curved surface portion that corresponds in shape to the curved surface to be cut on the workpiece.

In the present form of the apparatus of the invention, the cutter means comprises a motor 16 having a rotating shaft 18 and a cutter head assembly 20 which is operably interconnected with shaft 18. As best seen by referring to FIG. 2, cutter head assembly 20 comprises a rotatable shaft 22 having a pulley 24 mounted on the first end thereof and a cutter head 26 removably mounted on the second end thereof. Pulley 24 is operably interconnected with a pulley 28 mounted on motor shaft 18 by a suitable drive belt 30.

The cutter means is movable between first and second positions along first guide means here provided as a pair of horizontally extending first guide rods 32. First guide rod engagement means, shown here as bushings 34 (FIG. 1), are provided on the cutter means for guiding the movement of the cutter means along the first guide rods between the first and second positions.

Drive means, here provided in the form of hydraulic assembly 36, are mounted on the supporting frame for controllably moving the cutter means along the first guide rods. Hydraulic assembly 36 is of conventional design and, as shown in FIG. 24, includes a hydraulic cylinder 36a within which a piston 36b reciprocates. A connecting rod 36c is connected at one end to piston 36b and at the opposite end to a bracket 37 which comprises a part of the cutter means.

As indicated in FIG. 3, limit switches 38, also of conventional design, are provided at either end of the frame assembly for automatically controlling the reciprocal movement of the cutter means along the first guide rods 32. As will be discussed in greater detail hereinafter, this controlled movement of the cutter means, which could also be accomplished pneumatically or electrically, moves the cutter head 26 past a selected workpiece 42 after the workpiece has been securely clamped in position on the support means of the apparatus.

Figure 9:
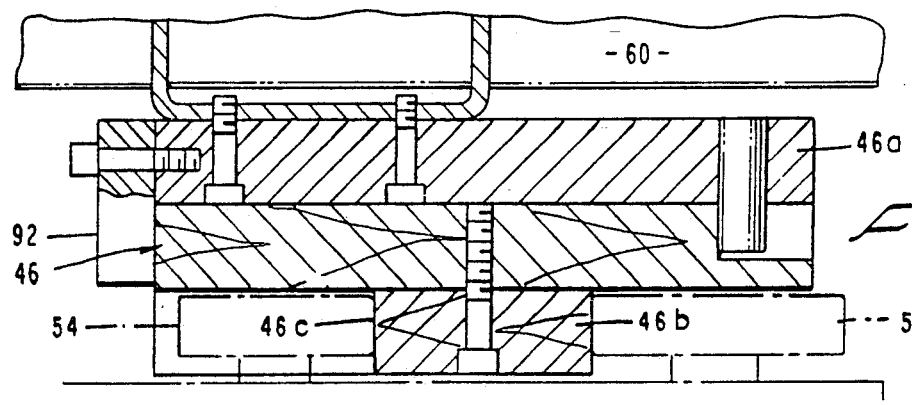
FIG. 9 is a cross-sectional view taken along lines 9—9 of FIG. 1

Turning once again to FIGS. 1 and 2, the support means of the present embodiment comprises the previously mentioned generally horizontally extending supporting table 15, which includes a lower surface 15a and an upper surface 15b upon which the workpiece 42 (FIG. 1) rests. The support means also include locating mean for precisely positioning the workpiece on the supporting table. The locating means here comprises clamping means provided in the form of a plurality of clamping assemblies 44 and a pair of locating elements 45 (FIG. 1) which are controllably movable relative to supporting table 15 for engagement with the workpiece 42 to center it with respect to the cutter head and the template 46. The details of the construction and operation of the clamping assemblies and the locating elements will presently be described. Also forming an important part of the support means of the apparatus of the present invention is the previously mentioned template 46 which is removably mounted below the supporting table 15 for engagement by the follower means. As best seen in FIGS. 6 and 9, template 46 includes an upper planar portion 46a and a lower curved portion 46b.

Figure 8:
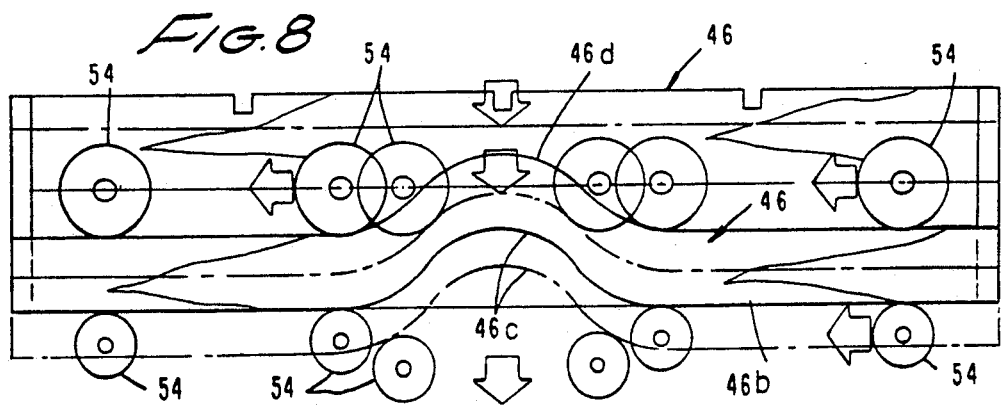
FIG. 8 is a fragmentary top plan illustrational view showing the manner in which the rollers of the follower assembly transverse the template or pattern.

As indicated FIGS. 2, 6 and 20, the follower means here comprises a follower assembly generally designated by the numeral 50, which extends forwardly of frame 14 and is connected to the cutter means by a follower supporter assembly 51 in the manner shown in FIG. 2 and 6 so that, as the cutter means reciprocates within frame 14, the follower assembly will also move back and forth beneath the supporting table 15. As best seen in FIG. 6, the follower assembly includes a forwardly extending support member 52 upon which is rotatably mounted a pair of spaced-apart rollers 54. As indicated in FIG. 8, as the cutter means, along with the follower means, reciprocates longitudinally of frame 14, the rollers 54 will follow along the front and rear, spaced-apart curved surfaces 46c and 46d of the template 46 in the manner illustrated in FIGS. 8, 19 and 20. As will be described n the following paragraphs, this movement of the follower assembly causes precisely controlled movement of the supporting table and the workpiece secured thereto toward and away from the cutter head 26.

Figure 22:
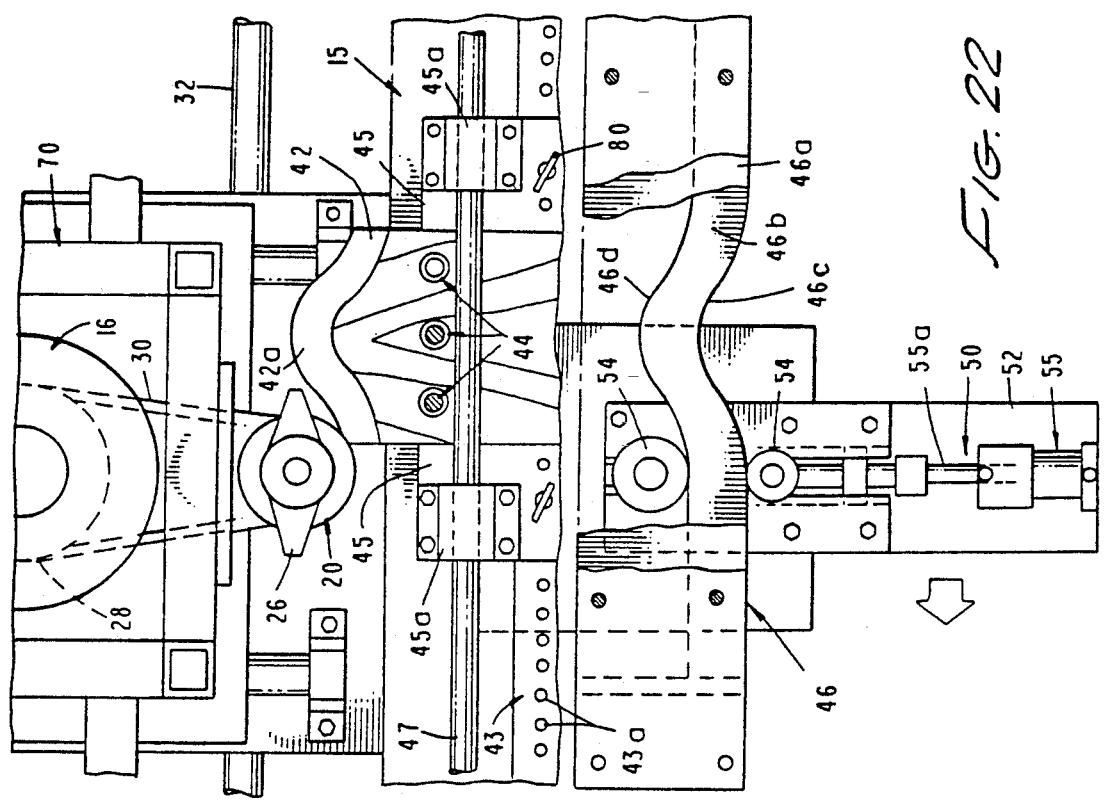
FIG. 22 is a top plan positional view illustrating the cutter head in a forward three-quarter cycle position with the curved surface on the workpiece having been formed.

Turning particularly to FIGS. 2 and 19, the support means of the apparatus can be seen to further include second guide means provided here as a pair of second guide rods 56 which are mounted below table 15. Second guide rods 56 are slidably received within second guide rod engagement means, here provided as spaced-apart sets of bushings 58, which are mounted on forwardly extending support assembly 60 which comprise a portion of rigid frame 14. With the construction thus described, as the cutter means moves from the first position to the second position, the rollers will roll along the front and rear surfaces of template 46 from the position shown in FIG. 2 to the position shown in FIG. 22. Since the work supporting means, including second guide rods 56, are free to slidably move within bushings 58 forwardly and rearwardly relative to the cutting head 26 as indicated by the arrow in FIG. 19, the workpiece 42 when clamped securely in position on the supporting table will move relative to cutter 26 along a path corresponding to the path of travel of rollers 54. In this way the curved surfaces 42a (FIG. 4) will be cut on the workpiece. The radius of these surfaces, of course precisely correspond to the radius of the front surface of the template 46 along which one of the rollers 54 of the follower means roll. The other of the rollers "floats" along the backside of the template. This makes templates quite easy to fabricate because the rear surface need not be perfectly, geometrically identical to the front surface. To insure that rollers 54 are maintained in engagement with the template, hydraulic damper means, shown in FIG. 6 as a conventional hydraulic damper assembly 55 having a push rod 55a, function to yieldably urge rollers 54 continuously against the curved surfaces of template 46.

As best seen in FIGS. 2 and 3, motor 16 is mounted within an inner, cage-like assembly 70 which is provided with spaced-apart bushings 72. Bushings 72 are adapted to slide along third guide means, or guide rods 74, also mounted within cage-like frame 14. With this construction, inner-cage 70 along with motor 16 and cutter assembly 20, can be precisely moved forwardly and rearwardly within frame 14 so as to position the cutter 26 at a desired starting location with respect to the workpiece 42. In this way, workpieces of various sizes as well as cutter heads of various configurations can readily be accommodated.

In operating the apparatus of the present form of the invention, the desired cutting head 26 is affixed to shaft 22 and motor cage 70 is positioned in the desired location for accomplishing work on the workpiece 42 which is to be cut. Next, the workpiece 42 is placed on the work table 15 with its forward edge against adjustable stops 73 (FIG. 3) and its sides intermediate locating elements 45. As best seen in FIG. 5, a pair of bushings 45a are connected to each of the elements 45. Bushings 45a slide along fourth guide means shown here as a pair of fourth guide rods 47 which are mounted on table 15.

Figure 12:
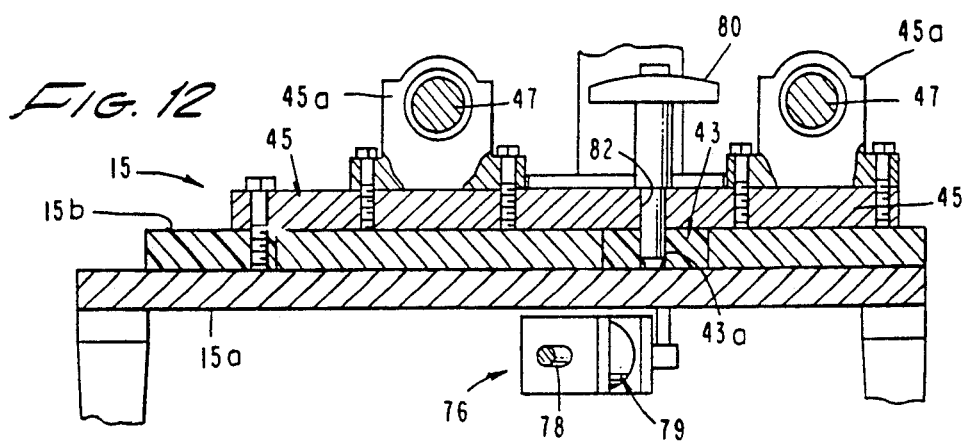
FIG. 12 is a cross-sectional view taken along lines 12—12 of FIG. 11.

Referring particularly to FIGS. 5 and 10, it can be seen that supporting table 15 is provided with a longitudinally extending groove 15c within which a pair of slides 43 can slide. Slides 43, which comprise a part of the locating means for locating the workpiece on the supporting table, are provided with a plurality of longitudinally spaced apertures 43a, the purpose of which will presently be described. The locating means of this form of the invention also comprises a hydraulically or pneumatically operated linkage mechanism generally designated in FIG. 10 by the numeral 76. One link 76a of the linkage mechanism is operably interconnected with one of the slides 43 while a second link element 76b is operably interconnected with the second slide 43. A central linkage member 76c is interconnected to linkage members 76a and 76b at locations intermediate the ends of the linkage member 76c. Member 76c is also connected proximate one end thereof with a hydraulic connector rod 78 which forms a part of hydraulic actuating means for operating the linkage assembly. The hydraulic actuating means also includes a cylinder 79 which is connected to supporting table 15. As is apparent from FIG. 10, with this construction movement of the connecting rod 78 toward the right as viewed in FIG. 10 will cause slides 43 to move toward one another. In order to accommodate for larger or smaller workpieces, the spacing between the locating elements 45 of the invention is made adjustable through the use of locking pins 80 of the character shown in FIG. 5. Locking pins 80 are receivable within apertures 82 formed in locking elements 45 which apertures are selectively indexable with longitudinally-spaced apertures 43a provided in slides 43. With this construction, in initially setting up the locating means, the locating elements 45 are spaced apart a distance slightly wider than the width of the workpiece and in alignment with selected indicia, such as indicia "12" (FIG. 10). This done apertures 82 in locating elements 45 are aligned with the selected apertures 43a in slides 43. Pins 80 are then inserted through apertures 82 and into apertures 43a in the manner shown in FIG. 12 so as to interlock together the slides and the locating elements. With pins 80 in position, the workpiece can be inserted between the locating elements 46 at any location. Upon activation of the linkage assembly, the slides 43 will urge the locating elements 46 into clamping engagement with the edges of the workpiece sliding it in one direction or another to the point that the work piece is secured between locating elements 45. The arrangement of the linkage assembly 76 is such that when the locking elements 45 are in locking engagement with the spaced-apart sides of the workpiece, the workpiece will automatically be precisely centered with respect to the cutter head and the template.

Figure 11:
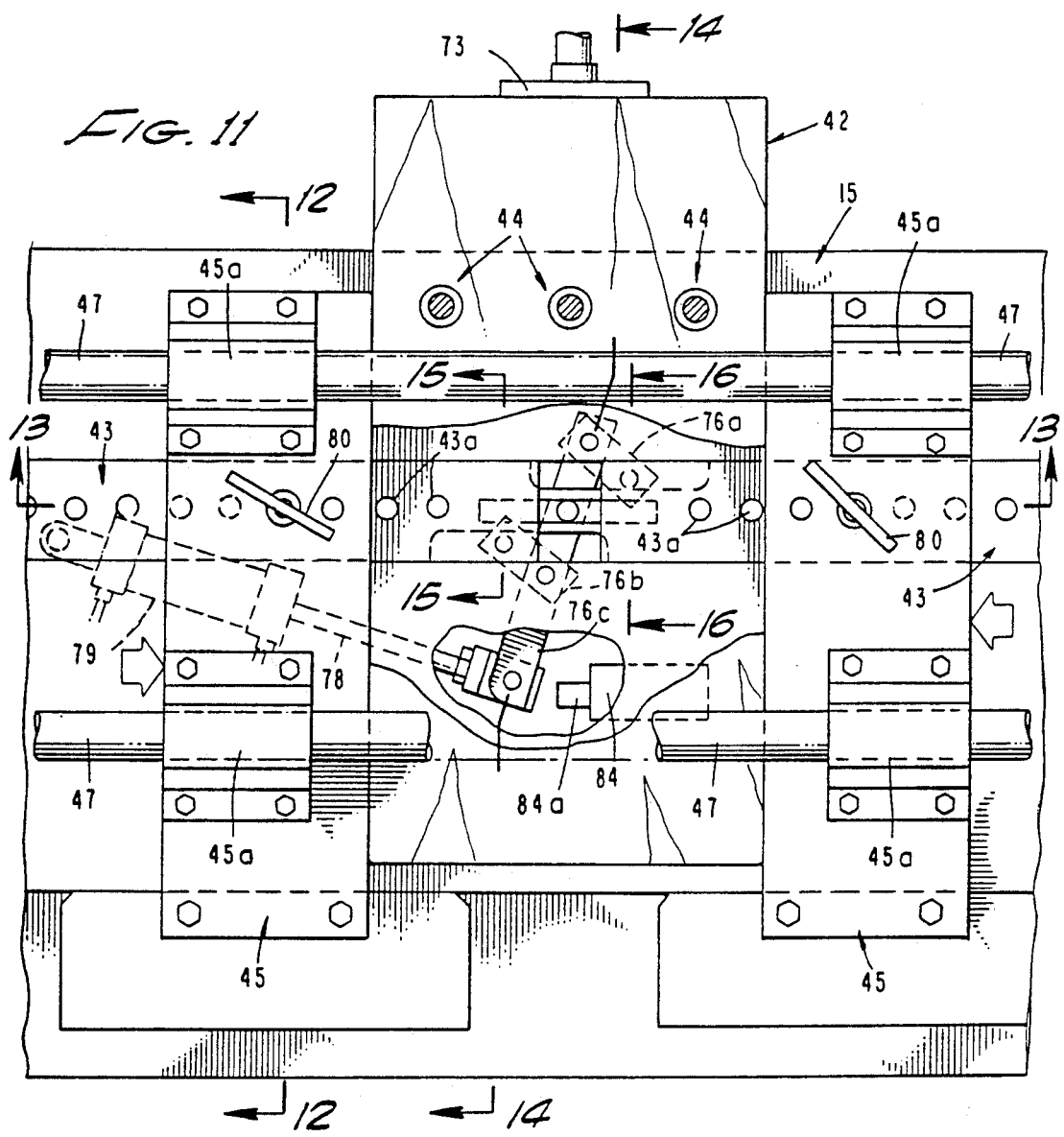
FIG. 11 is an enlarged fragmentary top plan view of the supporting table similar to FIG. 10 further illustrating the mechanism for operating the centering slides.

As indicated in FIGS. 11 and 17, safety means in the form of a safety switch 84 is provided to disable the locking means if a workpiece of the wrong size is placed between locking elements 45. More particularly, if the workpiece is too small for the selected positioning of the locating elements, for example, 6½ inches wide (FIG. 17) and the locking elements are aligned with the numbers "12" engraved on the work table, (FIG. 10) travel of the connector rod 78 to the right past the point of correct engagement of the locking element 45 with the correct 7¾ inch wide workpiece will result in the engagement of the connector rod 78 with plunger 84a of the safety switch (FIG. 17) which will disable the hydraulic means. With the correct 7¾ inch workpiece, the connector rod 78 will not contact plunger 84a and the safety switch will not be activated.

When the workpiece is correctly centered and the template in place, the clamping assemblies 44 are then actuated by a foot switch causing the workpiece engaging heads 44a to move downwardly into clamping engagement with the workpiece 42 in the manner shown in FIG. 1. As best seen in FIG. 5, clamping assemblies 44 are supported by a cross member 90 which is elevated above the work table 15. The clamping assemblies may be hydraulically, pneumatically or electrically operated (for example, solenoid operated) in a manner such that connecting rods 44b to which heads 44a are interconnected can be controllably moved upwardly and downwardly within housings 44c and into and out of secured clamping engagement with the work piece 42.

Prior to placing the workpiece in position, the desired template is selected and positioned within the template holding assembly 86 in the manner shown in FIGS. 1 and 6. As indicated in these figures, the template holding assembly 86 is connected to table 15 by a connector plate 87 and comprises upper and lower plates 88 and 90 between which the template 46 can be slidably inserted and locked in position by means of swiveling keeper members 92. Each of the templates 46 is provided with grooved portions 46e which is adapted to mate with tongues provided on a locating elements 94 which, as shown in FIG. 6, forms a part of template holding assembly 86. With this construction, when the template 46 is in position within the holding assembly, it will be precisely centered with respect to the workpiece after the work piece has been clamped in position by the locating means of the apparatus. It should be noted that safety switches are preferably provided so that, until the template is in place, no other function can be performed. The template holding assembly will receive templates of varying configuration and is designed so that each template is precisely indexed with respect to the particular workpiece that is clamped into position on the support table by the clamping and locating means.

Figure 21:
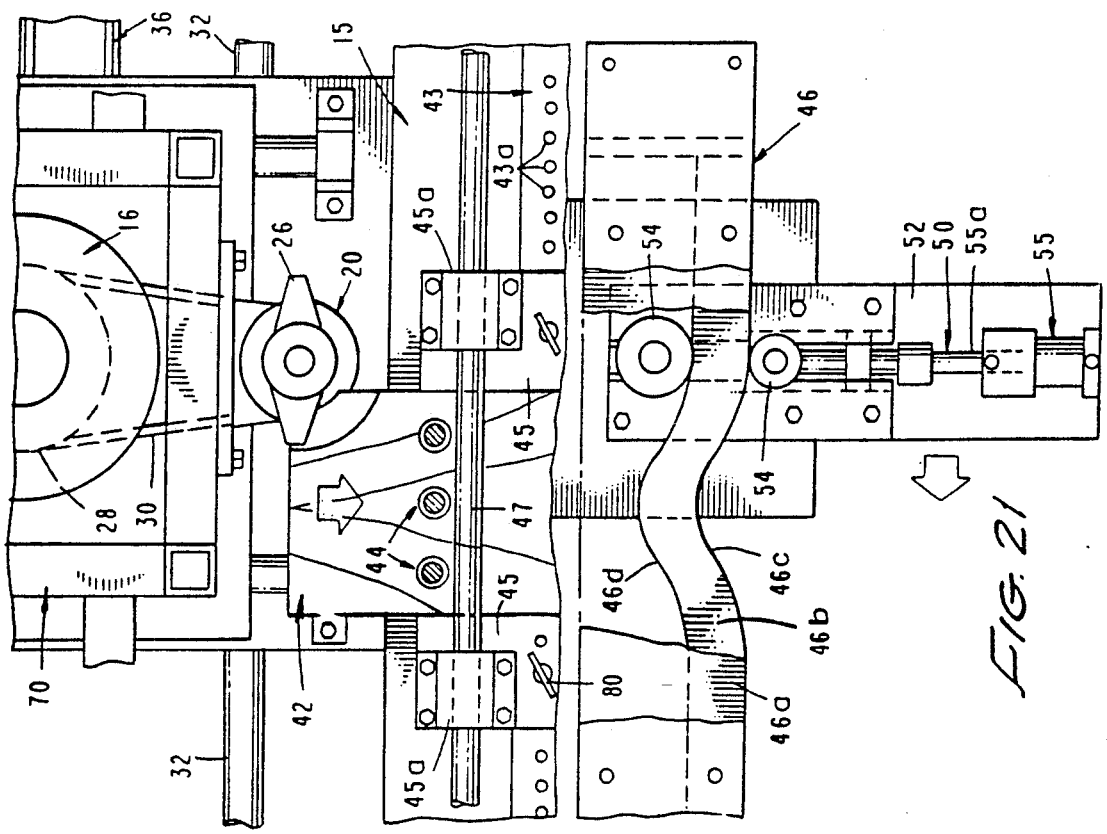
FIG. 21 is a top plan positional view illustrating the position of the motor and cutter head assembly at the beginning of the cutting cycle.

With the proper template in place and the workpiece clamped to the table, motor 16 is energized using an appropriate hand switch and the cutter assembly, along with the template, is moved longitudinally of the frame by the hydraulic drive means 36. As the cutter assembly moves to the left as shown in FIG. 21 the rollers 54 will engage the lower curved portion of the template as indicated in FIGS. 8 and 21. When the cutter assembly reaches the mid cycle point the apparatus will be in the position indicated in FIGS. 18 and 20 and the rollers 54 will be at the mid point of the template 46. At this position the table 15 has moved away from the cutter a maximum distance so as to form the top portion of the arch indicated by the letter "T" in FIG. 4 Continued movement of the cutter to the left will position the apparatus as shown in FIG. 21. At the end of the forward cycle the apparatus will be as shown in FIGS. 23 and 24. Engagement of the limit switches 38 will then cause disenablement of the hydraulic drive and the automatic release of the locating means to that the formed workpiece can be removed. The cutter means will remain in the position shown in FIGS. 23 and 24 until another cycle is commenced. During the return cycle, the cutter assembly will form a second workpiece in the manner described in the preceding paragraphs. At the end of the second cycle, the apparatus will be in the starting position with the drive and locating means having been disabled by a second set of limit switches. The safety switches, hand switches and limit switches of the apparatus and their manner of interconnection are well understood by those skilled in the art.

Referring now to FIGS. 25 through 40 another form of

Referring now to FIGS. 25 through 40 another form of cutting apparatus for cutting a workpiece of wood, plastic or the like is there shown and generally designated by the numeral 112. As was the case with the previously described embodiment, the major operating subassemblies of the apparatus of this latest form of the invention comprise a rigid, cage-like supporting frame 114, cutter means mounted within the frame for cutting the workpiece, and support means, including a supporting surface 115, for supporting the workpiece. This form of the apparatus also includes a hopper means for supporting a plurality of workpieces. As will be described more fully hereinafter, the hopper means comprises an angularly extending hopper 116 mounted on the supporting frame proximate supporting surface 115.

In the present form of the apparatus of the invention, the cutter means comprises a carriage means which supports a motor 117 having a rotating drive shaft 118 and a cutter head assembly 120 which is operably interconnected with shaft 118. As best seen by referring to FIG. 25, cutter head assembly 120 comprises a rotatable shaft 122 having a pulley 124 mounted on the first end thereof and a cutter head 126 removably mounted on the second end thereof. Pulley 124 is operably interconnected with a pulley 128 mounted on drive shaft 110 by a suitable drive belt 130.

The carriage means, which comprises a cage like carriage 131 is movable between first and second positions along guide means here provided as a pair of first guide members or rods 132. Guide rod engagement means, shown here as bushings 134 (FIG. 29), are provided on the carriage for guiding the movement of the carriage along the guide rods between the first and second positions.

Drive means, here provided in the form of hydraulic assembly 136, are mounted on the supporting frame for controllably moving the carriage along the guide rods. Hydraulic assembly 136 is of conventional design and, as shown in FIG. 28, includes a hydraulic cylinder 136a within which a piston 136b reciprocates. A connecting rod 136c is connected at one end to piston 136b and at the opposite end to a bracket 137 which is connected to frame 114 and comprises a part of the cutter means. Cylinder 136a is appropriately connected to hydraulic lines 137 in a manner well known to those skilled in the art.

As indicated in FIG. 29, limit switches 138, also of conventional design, are provided at either end of the supporting frame and comprise part of the switch means for automatically controlling the reciprocal movement of the locating and clamping means of the invention, the transfer means and the reciprocal movement of the carriage along the guide rods 132. As will be discussed in greater detail hereinafter, this sequentially controlled movement of the various operating components of the apparatus can be accomplished pneumatically or electrically as the cutter head 126 moves back and forth past a selected workpiece 142 (FIG. 32).

Figure 33A:
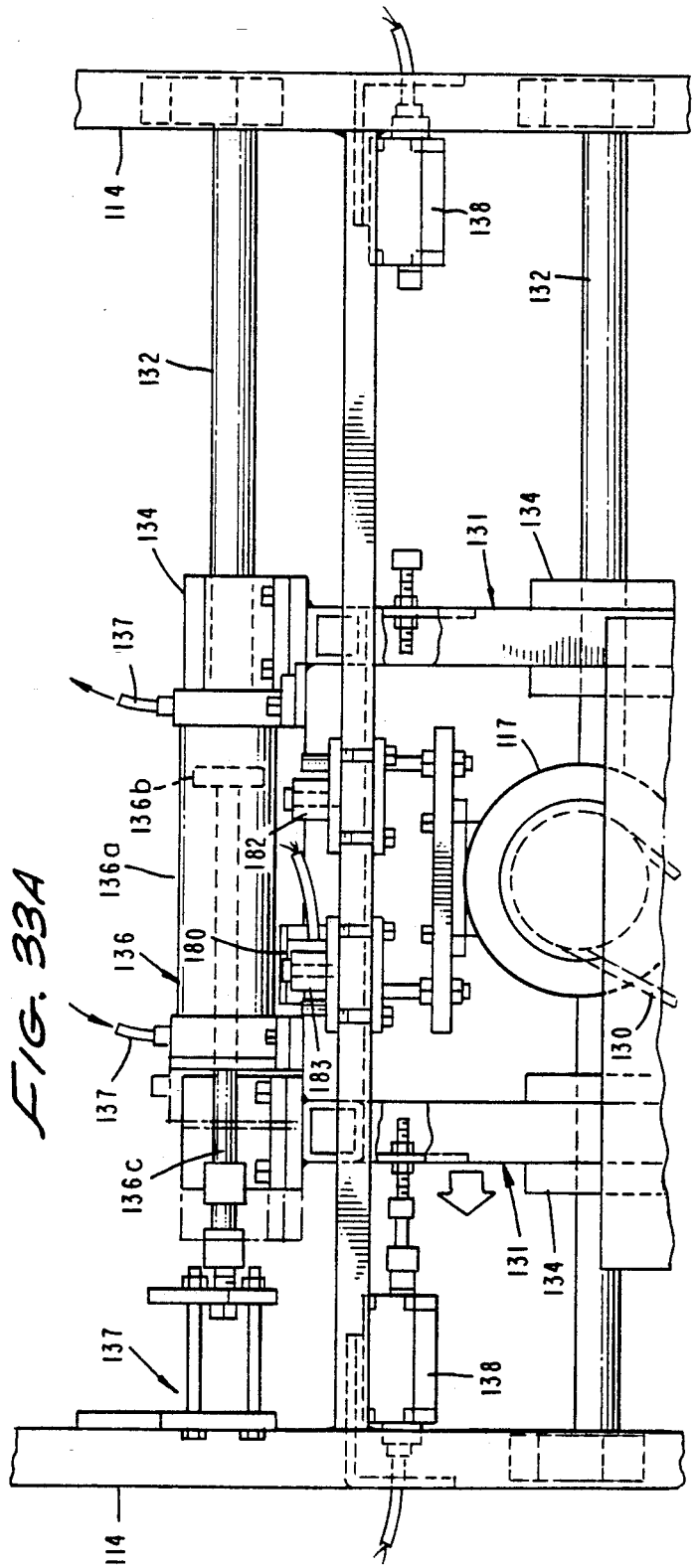
FIGS. 33A and 33B represent a view taken along lines 33—33 of FIG. 32.
Figure 33B:
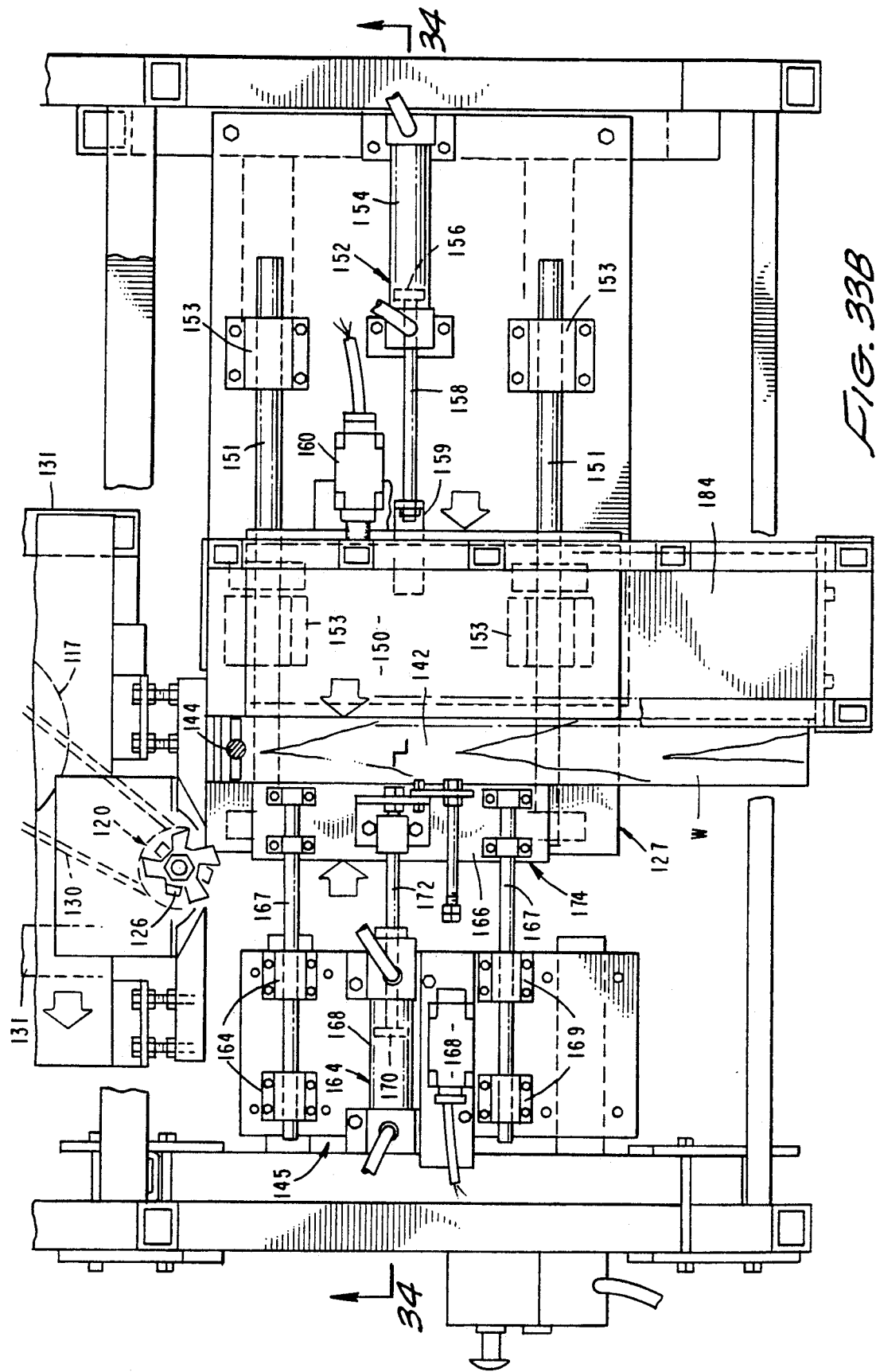

Turning to FIGS. 33 and 34, the support means of the present embodiment comprises the previously mentioned, angularly upwardly extending supporting table 127, which includes the upper supporting surface 115 upon which the workpiece 142 rests. The support means also includes securement means for precisely positioning the workpiece on the supporting table. The securement means here comprises clamping means provided in the form of a clamping element 144 and a transverse locating assembly 145 (FIG. 32) both of which are controllably movable relative to the supporting table for engagement with the workpiece 142 to properly position it with respect to the cutter head 126. The details of the construction and operation of the clamping and locating assemblies will presently be described.

Another important feature of the apparatus of this form of the invention comprises transfer means for sequentially transferring the workpieces one at a time from the hopper 116 to the supporting surface 115. As best seen by referring to FIGS. 31, 32, 33 and 34, the workpieces W are stacked one on top of another within the hopper 116. The bottom workpiece, designated in FIG. 31 by the numeral 142, is engagable by a pusher member 150 which comprises a part of the transfer means. Pusher member 150, along with table 127 and guide rods 151 is movable within guide bearing 152 (FIG. 33B) from the first position shown in FIG. 31 to the second position shown in FIG. 32 by a hydraulic assembly 152 (FIG. 33B) which is connected to the supporting frame and comprises a cylinder 154 within which a piston 156 reciprocates. Piston 156 is connected to a rod 158, the outboard end of which is connected to table 127 and to pusher member 150 via a bracket 159 in the manner best seen in FIGS. 33B, 35 and 36. As the pusher member and the table is moved to the left from the first position shown in figure 31 to the second position shown in FIG. 32, the bottom workpiece 142 will be moved to the left and will drop onto support surface 115 in the manner shown in FIG. 34. Upon reaching this position, a limit switch 160 will actuate hydraulic assembly 162 which functions to move the clamping element 144 into clamping engagement with the workpiece in the manner illustrated in FIG. 32.

Hydraulic assembly 162 is of standard construction having a hydraulic cylinder 163 within which a piston 165 reciprocates. Clamping element 144 is connected to piston 165 so that it can be controllably moved upwardly and downwardly relative to the workpiece. At the same time that clamping element 144 moves toward clamping engagement with the workpiece hydraulic assembly 164 will move locating assembly 145 to the left from the first retracted position shown in FIG. 31 to the clamping position shown in FIGS. 32 and 34 and will move locking member 166 into engagement with the side of the workpiece 142. Hydraulic assembly 164 is connected to the supporting frame and is also of standard construction comprising a hydraulic cylinder 168 within which a piston 170 reciprocates. Connector rod 172 is connected at one end to piston 170 and at the other end to a clamping assembly 174 which includes workpiece engaging or locking member 166. As piston 170 reciprocates within cylinder 168, assembly 174, along with guide rods 167, will move within bearings 169 from the first retracted position to the second clamping position shown in FIG. 33B. With members 166 clamping element 144 in engagement with the workpiece, the workpiece will be locked against the work table and will be properly positioned relative to cutter head 126 so that the cutting step can be accomplished as the carriage moves along guide rods 132.

As before, the limit or control switches which activate the transfer means, the securement means, and the carriage reciprocating means are of standard construction and their installation and operation is well understood by those skilled in the art.

Figure 26:
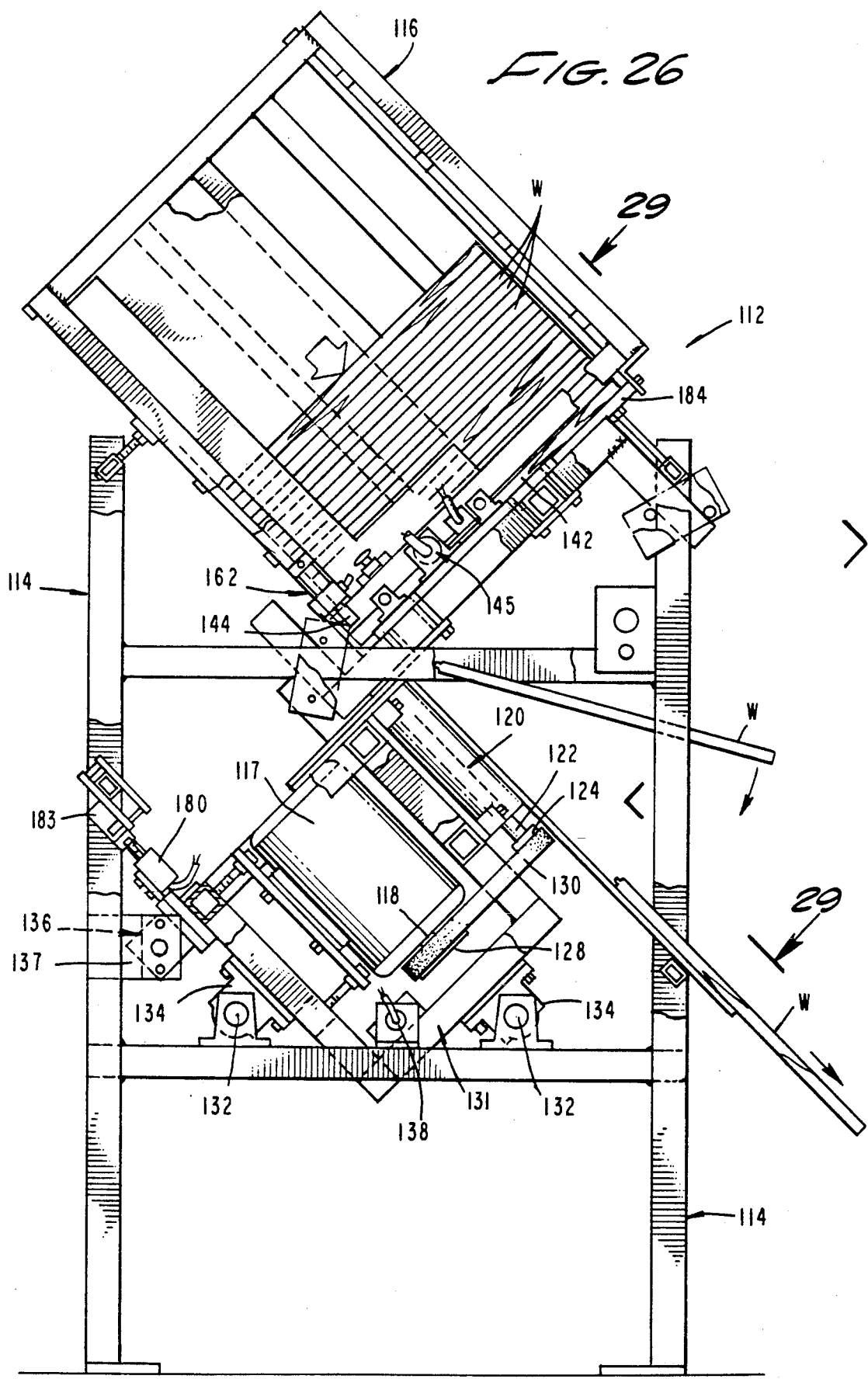
FIG. 26 is a view taken along lines 26—26 of FIG. 25.
Figure 27:
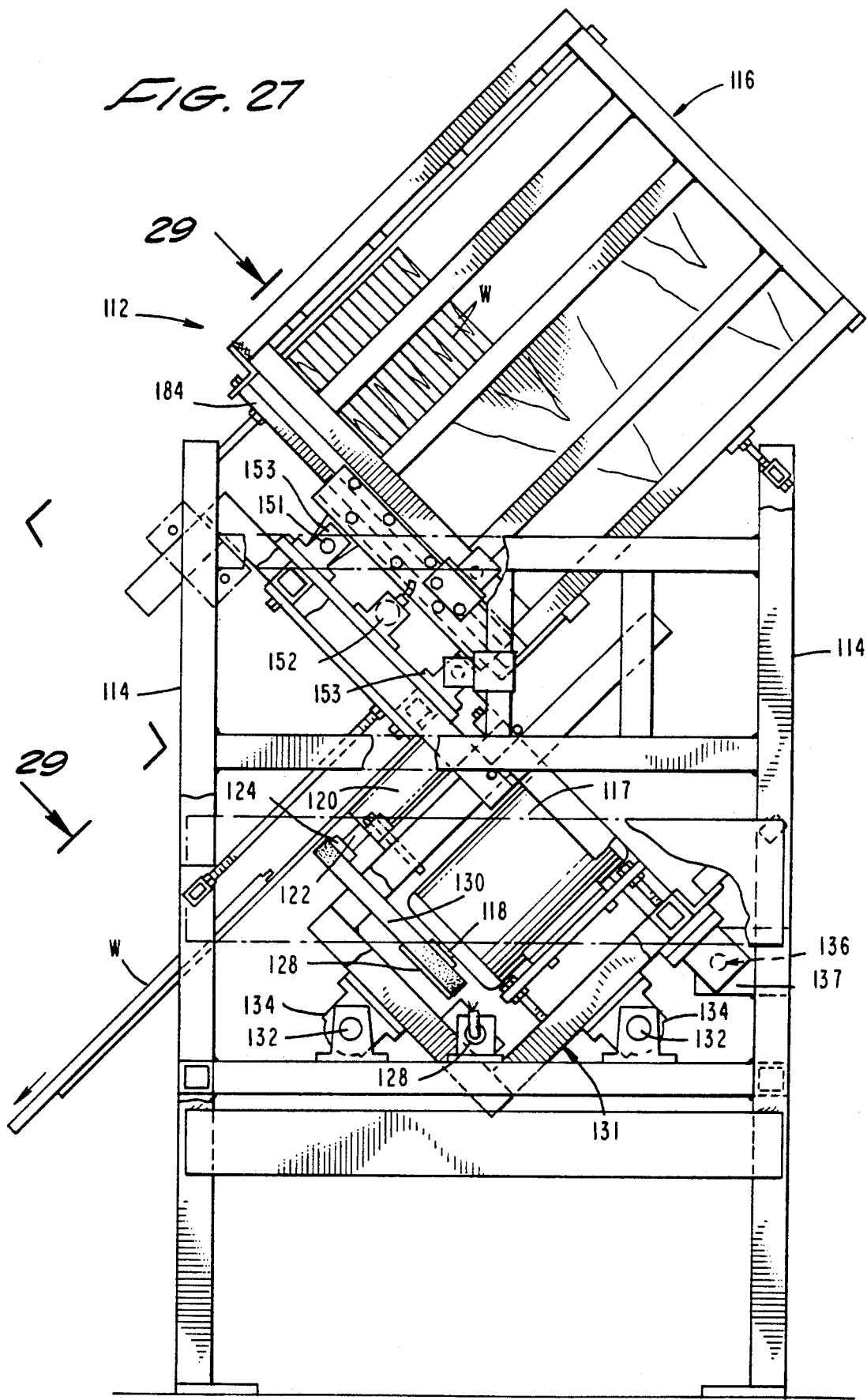
FIG. 27 is a view taken along lines 27—27 of FIG. 25.
Figure 39:
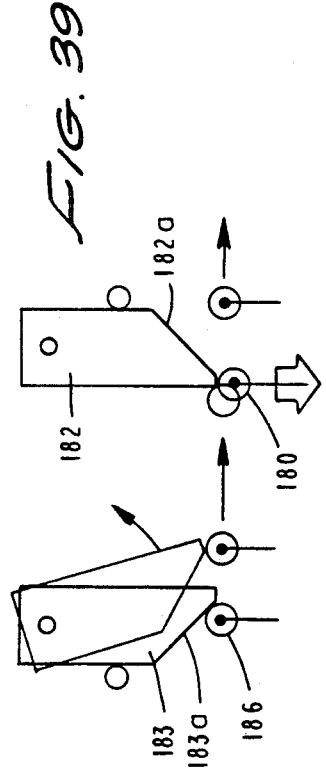
FIG. 39 is a generally schematic view illustrating the displacement of the limit switches of the apparatus as the cutter head moves relative to the workpiece.
Figure 36:
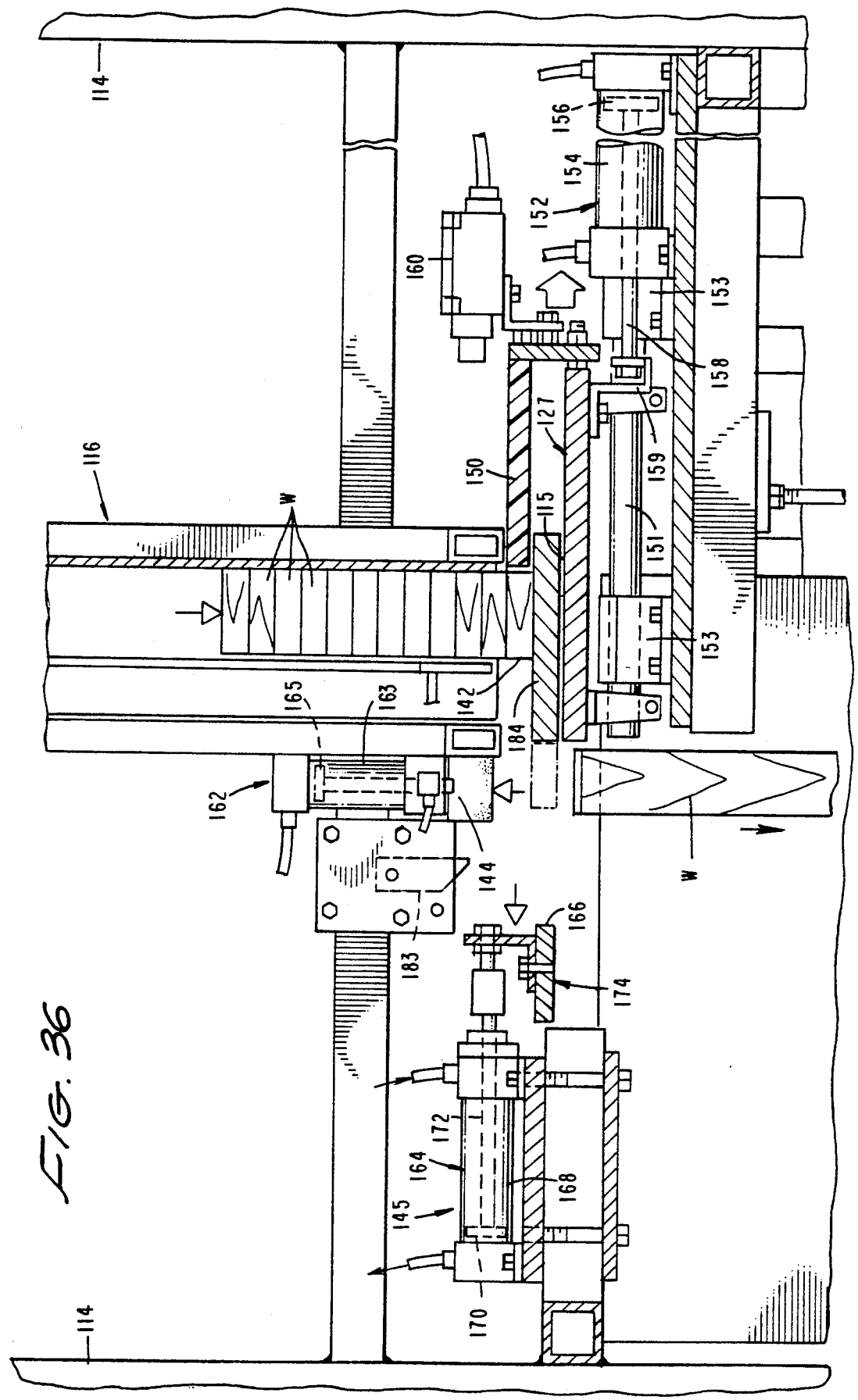
FIG. 36 is a view similar to FIG. 34 but showing the ejection of the workpiece from the cutting position following completion of the cutting operation.
Figure 37:
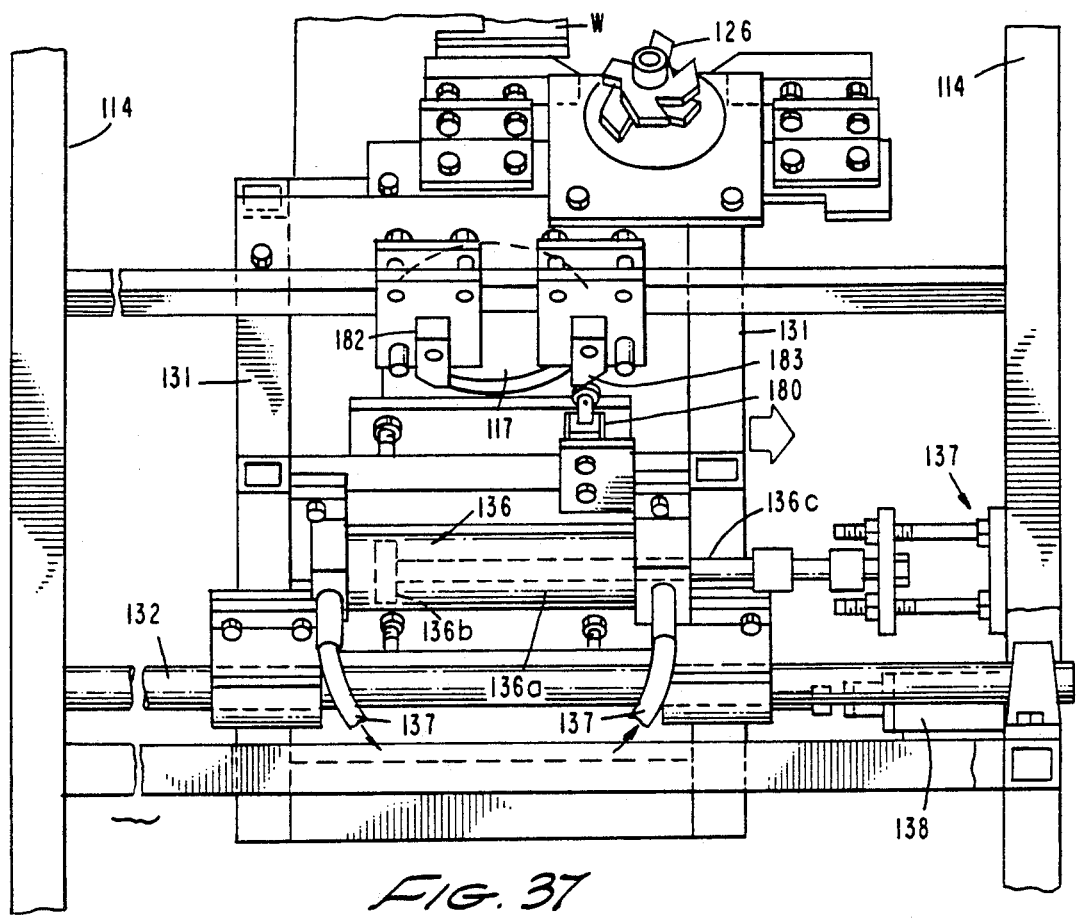
FIG. 37 is a fragmentary rear view similar to FIG. 28 showing the movement of the cutting head relative to the controlling limit switches.
Figure 38:
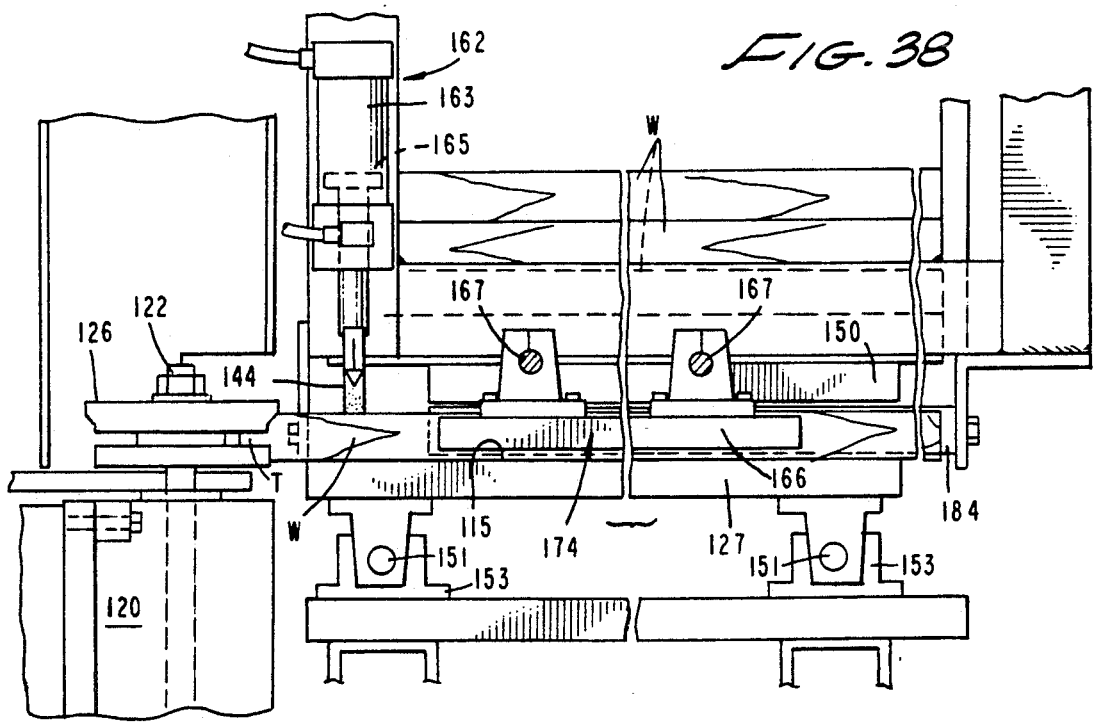
FIG. 38 is a view taken along lines 38—38 of FIG. 34.

Once the cutting operation of the workpiece has been completed, the ejection means of the invention functions to eject the finished workpiece from the work table in the manner illustrated in FIGS. 26, 27 and 36. More particularly, as shown in FIGS. 37 and 39, movement of the carriage to the right causes a switching means comprising switch 180, which is mounted on the carriage 131 to engage one of the switch actuating means, in this case finger 182. As indicated in FIGS. 37 and 39, when the carriage carries the cutter head past the workpiece, switch 180 is depressed by finger 182 and is actuated so as to cause the clamping element and the locating member 176 to move from the securement position shown in FIG. 34 to the retracted position shown in FIG. 36. At the same time, pusher member 150 along with table 127 moves from the position shown in FIG. 34 to the position shown in FIG. 36. As the table thusly moves, ejection member 184 engages workpiece 142 in a manner to prevent its movement with the table. When the table reaches the position shown in FIG. 36, the workpiece, which is no longer supported by surface 115, will fall downwardly by force of gravity.

It is to be noted that the switching means, which here comprises switches 180 and 186, is of unique construction. Switch actuation means, or fingers 182 and 184, are pivotally mounted on the supporting frame and include angularly extending edges 182a and 184a so that as the carriage moves one way the fingers will swing out of the way and, when the carriage moves the opposite way, the fingers will actuate its respective switch. More particularly, when the carriage moves to the right as shown in FIG. 39, finger 184 will swing out of the way but finger 182 will actuate switch 180. Conversely, when the carriage moves to the left, finger 182 will swing out of the way and finger 184 will actuate switch 186.

Figure 30A:
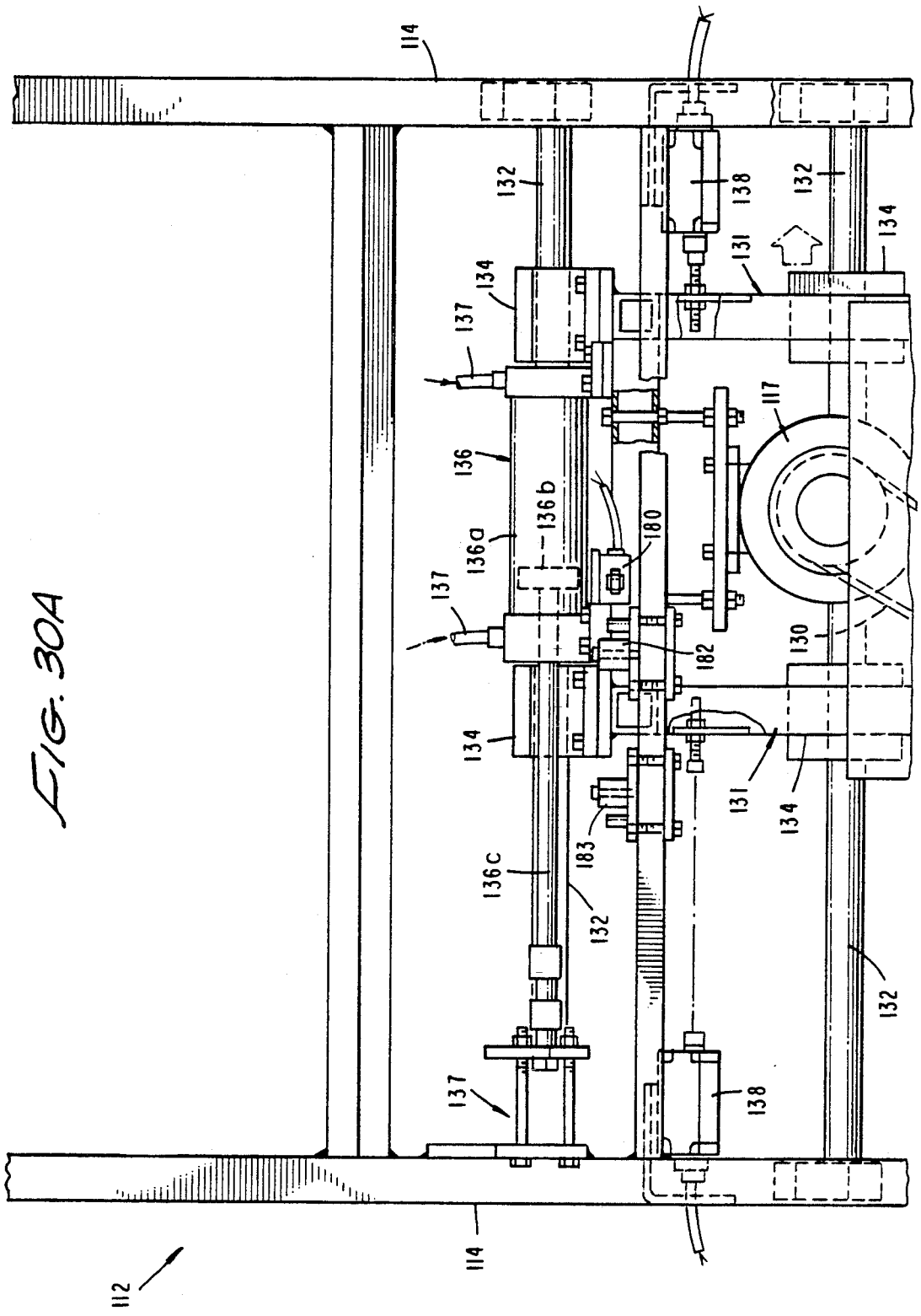
FIGS. 30A and 30B represent a view taken along lines 30—30 of FIG. 29.
Figure 30B:
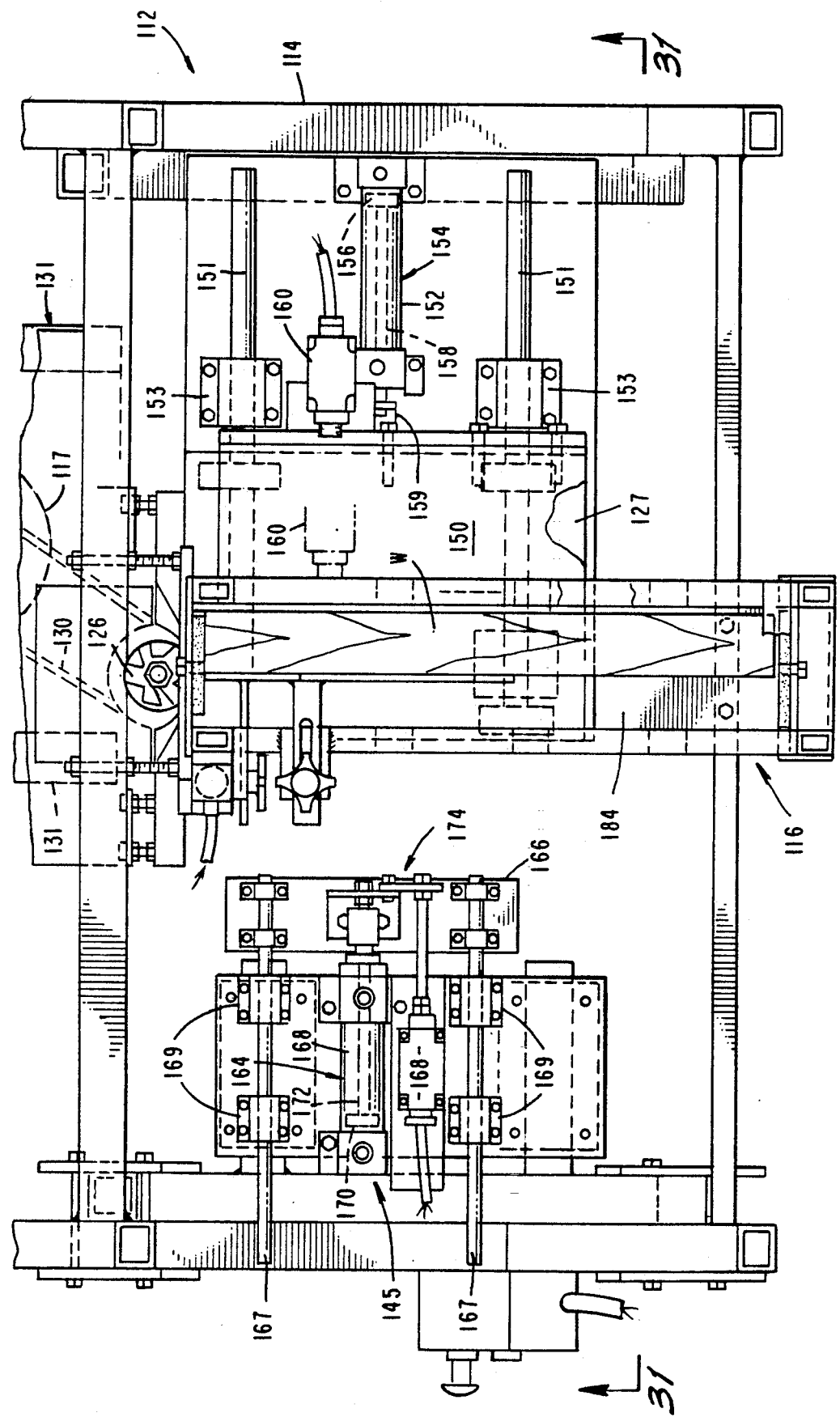
Figure 40:
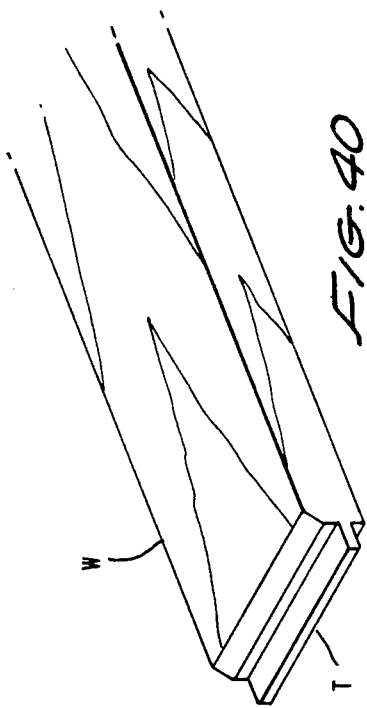
FIG. 40 is a generally perspective view of the workpiece after cutting.

During the cutting cycle, when the locating assembly 145 reaches the retracted position shown in FIG. 30B, limit switch 168 will be actuated causing the reverse cutting cycle to begin. More particularly, the transfer means will be actuated in a manner to transfer the next workpiece from the hopper to the worktable. The locating assembly then moves toward the workpiece will be securely held in position as the cutter moves past the workpiece in the reverse direction (to the left as viewed in FIG. 37). Once the workpiece is cut, the carriage will move past finger 184 of the switching means in a manner to actuate switch 186 which, in turn, actuates the workpiece ejection step causing the locating assembly and the clamping element to once more move into their retracted position so that the cycle can be repeated. With this construction, an appropriate cut, such as the tongue T shown in FIG. 40, will be made on a work during both the forward and reverse movement of the carriage 131.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departure from the scope and spirit of the invention, as set forth in the following claims.

I claim:

1. An apparatus for cutting workpieces, comprising:
   (a) a supporting frame, including a guide member and a workpiece support surface;
   (b) a hopper connected to said supporting frame proximate said work support surface for supporting a plurality of workpieces in a stacked relationship;
   (c) transfer means for sequentially transferring said workpieces from said hopper to said supporting surface;
   (d) securement means for securing said workpieces relative to said supporting surface;
   (e) a carriage reciprocally movable along said guide member between first and second positions;
   (f) cutting means mounted on said carriage for cutting engagement with said workpieces as said carriage moves along said guide member;
   (g) ejection means mounted on said supporting frame for sequentially removing said workpieces from said supporting surface after cutting by said cutting means.

2. An apparatus as defined in claim 1 in which said cutting means comprises:
   (a) a motor connected to said carriage, said motor having a drive shaft; and
   (b) a cutter head assembly mounted on said supporting frame, said cutter head assembly comprising a rotatable shaft drivably connected to said drive shaft of said motor and a cutter head connected to said rotatable shaft for rotation therewith.

3. An apparatus as defined in claim 2 further including means for controllably moving said carriage along said guide member, said means comprising at least one hydraulic cylinder connected to said main frame.

4. An apparatus as defined in claim 2 in which said securement means comprises clamping means for imparting a downward force on said workpiece and locating means for imparting a transverse force against said workpiece.

5. An apparatus as defined in claim 2 in which said transfer means comprises means for moving said workpiece supporting surface relative to said hopper.

6. An apparatus for cutting workpieces, comprising:
   (a) a supporting frame, including a guide member and a workpiece support surface;
   (b) a hopper connected to said supporting frame proximate said work support surface for supporting a plurality of workpieces in a stacked relationship;
   (c) transfer means for sequentially transferring said workpieces from said hopper to said supporting surface, said transfer means comprising means for moving said workpiece supporting surface in relation to said hopper;
   (d) securement means for securing said workpieces relative to said supporting surface, said securement means comprising clamping means for imparting a downward force on said workpiece and locating means for imparting a transverse force against said workpiece;
   (e) a carriage reciprocally movable along said guide member between first and second positions;
   (f) cutting means mounted on said carriage for cutting engagement with said workpieces as said carriage moves along said guide member, said cutting means comprising:
      (i) a motor connected to said carriage, said motor having a drive shaft; and
      (ii) a cutter head assembly mounted on said supporting frame, said cutter head assembly comprising a rotatable shaft drivably connected to said drive shaft of said motor and a cutter head connected to said rotatable shaft for rotation therewith; and
   (g) ejection means mounted on said supporting frame for sequentially removing said workpieces from said supporting surface after cutting by said cutting means.

7. An apparatus as defined in claim 9 further including means for controllably moving said carriage along said guide member, said means comprising at least one hydraulic cylinder connected to said main frame.

* * * * *